(12) United States Patent
McGarry et al.

(10) Patent No.: US 8,063,350 B2
(45) Date of Patent: Nov. 22, 2011

(54) CIRCUITS AND METHODS ALLOWING FOR PIXEL ARRAY EXPOSURE PATTERN CONTROL

(75) Inventors: E. John McGarry, La Jolla, CA (US); Rafael Dominguez-Castro, Benacazón (ES); Alberto Garcia, Seville (ES)

(73) Assignee: Cognex Corporation, Natick, MA (US)

( * ) Notice: Subject to any disclaimer, the term of this patent is extended or adjusted under 35 U.S.C. 154(b) by 128 days.

(21) Appl. No.: 12/184,160

(22) Filed: Jul. 31, 2008

(65) Prior Publication Data

US 2009/0072120 A1 Mar. 19, 2009

Related U.S. Application Data

(60) Provisional application No. 60/953,905, filed on Aug. 3, 2007, provisional application No. 61/020,560, filed on Jan. 11, 2008.

(51) Int. Cl.
*H01L 27/00* (2006.01)
*H01L 31/00* (2006.01)
*H04N 3/14* (2006.01)
*H04N 5/335* (2011.01)

(52) U.S. Cl. ............ 250/208.1; 257/258; 257/292; 348/294; 348/302; 348/308

(58) Field of Classification Search ........... 250/208.1; 257/69, 72, 258, 291, 292; 348/294, 302, 348/308; 382/312, 321
See application file for complete search history.

(56) References Cited

U.S. PATENT DOCUMENTS

| | | | |
|---|---|---|---|
| 5,495,537 A | | 2/1996 | Bedrosian et al. |
| 5,588,435 A | * | 12/1996 | Weng et al. .............. 600/443 |
| 5,835,141 A | | 11/1998 | Ackland et al. |
| 6,240,208 B1 | | 5/2001 | Garakani et al. |
| 6,411,734 B1 | | 6/2002 | Bachelder et al. |
| 6,898,333 B1 | | 5/2005 | Gopalakrishnan et al. |
| 7,016,539 B1 | | 3/2006 | Silver et al. |
| 7,202,898 B1 | | 4/2007 | Braun et al. |
| 7,205,522 B2 | | 4/2007 | Krymski |
| 7,209,173 B2 | | 4/2007 | Fossum |

(Continued)

FOREIGN PATENT DOCUMENTS

EP 1 580 814 A1 9/2005

OTHER PUBLICATIONS

PCT International Search Report dated Oct. 22, 2008 for PCT/US08/71993.

(Continued)

*Primary Examiner* — John Lee

(57) ABSTRACT

An image processing system includes an image sensor circuit. The image sensor circuit is configured to obtain an image using a type of shutter operation in which an exposure pattern of a pixel array is set according to exposure information that changes over time based at least partially on charge accumulated in at least a portion of the pixel array. An image sensor circuit includes a pixel array and one or more circuits. The one or more circuits are configured to update exposure information based at least partially on one or more signals output from the pixel array, and to control an exposure pattern of the pixel array based on the exposure information. A pixel circuit includes a first transistor connected between a photodiode and a sense node, and a second transistor connected between an exposure control signal line and a gate of the first transistor.

30 Claims, 27 Drawing Sheets

U.S. PATENT DOCUMENTS

| | | |
|---|---|---|
| 7,271,835 B2 | 9/2007 | Iizuka et al. |
| 7,319,423 B2 | 1/2008 | Augusto et al. |
| 2003/0085336 A1 | 5/2003 | Wu |
| 2004/0103093 A1 | 5/2004 | Furuhashi et al. |
| 2005/0041128 A1* | 2/2005 | Baker .......................... 348/308 |
| 2006/0012697 A1* | 1/2006 | Boemler ...................... 348/296 |
| 2006/0186322 A1* | 8/2006 | Matsuyama ................. 250/226 |
| 2007/0046799 A1* | 3/2007 | Moholt ........................ 348/302 |
| 2007/0076109 A1 | 4/2007 | Krymski |
| 2007/0258007 A1 | 11/2007 | Justiss et al. |
| 2007/0273785 A1 | 11/2007 | Ogawa et al. |
| 2007/0285526 A1* | 12/2007 | Mann et al. ................. 348/222.1 |
| 2008/0012969 A1 | 1/2008 | Kasai et al. |
| 2009/0072120 A1* | 3/2009 | McGarry et al. ........... 250/208.1 |
| 2009/0141987 A1* | 6/2009 | McGarry et al. .............. 382/218 |

OTHER PUBLICATIONS

R. Forchheimer, et al., "Single-Chip Image Sensors With a Digital Processor Array", Journal of VLSI Signal Processing, 5, Kluwer Academic Publishers, Boston, 1993, pp. 121-131.

* cited by examiner

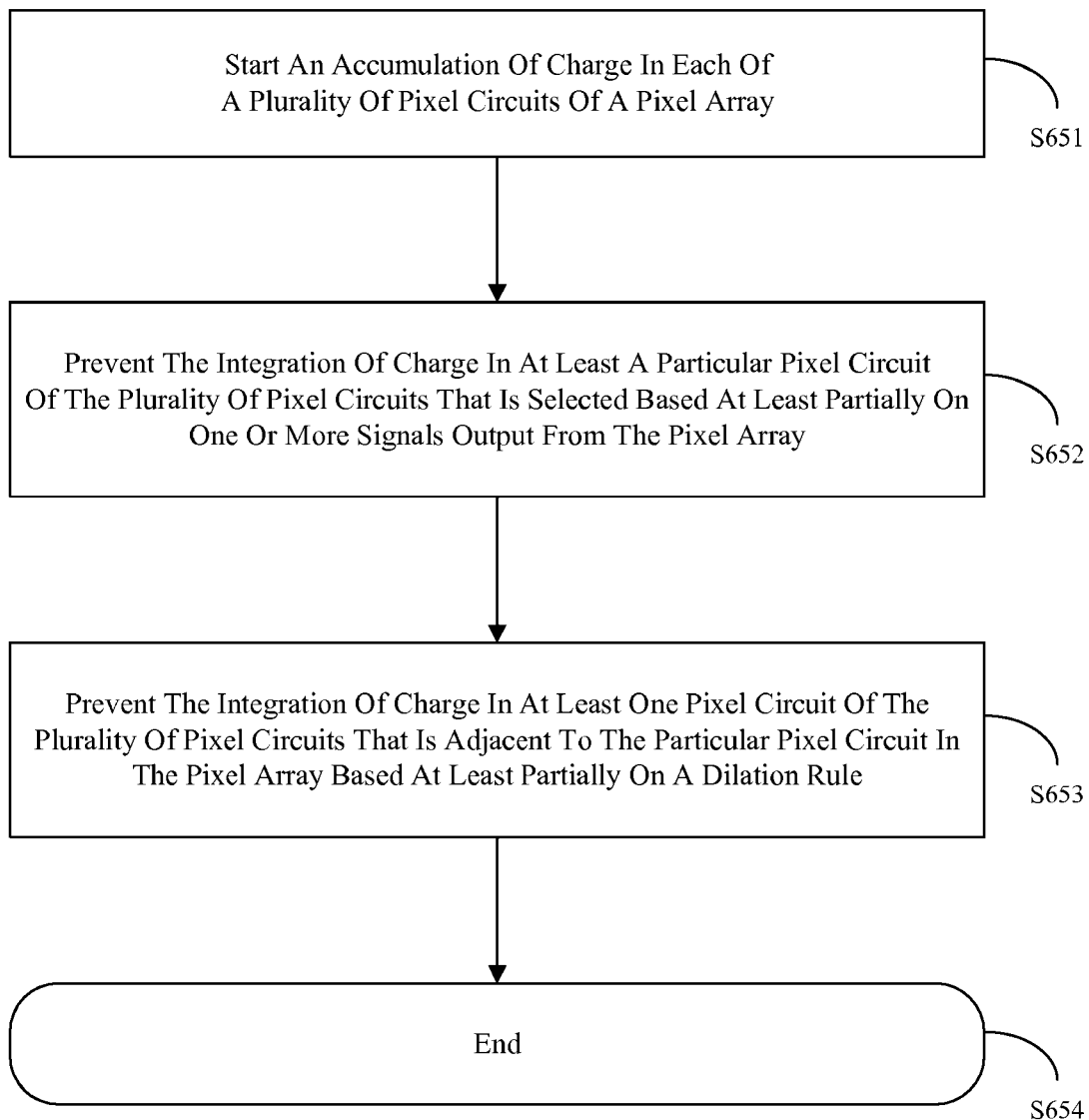

Column

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

Row

Column

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 1 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

Row

Column

|   | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 1 | 1 | 1 | 0 | 0 | 0 | 0 |
| 5 | 0 | 1 | 1 | 1 | 0 | 0 | 0 | 0 |
| 6 | 0 | 1 | 1 | 1 | 0 | 0 | 0 | 0 |
| 7 | 0 | 0 | 0 | 0 | 0 | 0 | 0 | 0 |

Row

|   | Column 1 | 2 | 3 | 4 | 5 | 6 | 7 | 8 |
|---|---|---|---|---|---|---|---|---|
| Row 1 | □ | □ | □ | □ | □ | □ | □ | □ |
| 2 | □ | □ | □ | □ | □ | □ | □ | □ |
| 3 | □ | □ | □ | □ | □ | □ | □ | □ |
| 4 | □ | ■ | ■ | ■ | □ | □ | □ | □ |
| 5 | □ | ■ | ■ | ■ | □ | □ | □ | □ |
| 6 | □ | ■ | ■ | ■ | □ | □ | □ | □ |
| 7 | □ | □ | □ | □ | □ | □ | □ | □ |

|   | Column 1 | 2 | 3 | 4 | 5 | 6 | 7 | 8 |
|---|---|---|---|---|---|---|---|---|
| Row 1 | 0 | 0 | 0 | 0 | 0 | 0 | 0 | 0 |
| 2 | 0 | 0 | 0 | 0 | 0 | 0 | 1 | 0 |
| 3 | 0 | 0 | 0 | 0 | 0 | 0 | 0 | 0 |
| 4 | 0 | 1 | 1 | 1 | 0 | 0 | 0 | 0 |
| 5 | 0 | 1 | 1 | 1 | 0 | 0 | 0 | 0 |
| 6 | 0 | 1 | 1 | 1 | 0 | 0 | 0 | 0 |
| 7 | 0 | 0 | 0 | 0 | 0 | 0 | 0 | 0 |

295

Column

| | 1 | 2 | 3 | 4 | 5 | 6 | 7 | 8 |
|---|---|---|---|---|---|---|---|---|
| 1 | 0 | 0 | 0 | 0 | 0 | 1 | 1 | 1 |
| 2 | 0 | 0 | 0 | 0 | 0 | 1 | 1 | 1 |
| 3 | 1 | 1 | 1 | 1 | 1 | 1 | 1 | 1 |
| 4 | 1 | 1 | 1 | 1 | 1 | 0 | 0 | 0 |
| 5 | 1 | 1 | 1 | 1 | 1 | 0 | 0 | 0 |
| 6 | 1 | 1 | 1 | 1 | 1 | 0 | 0 | 0 |
| 7 | 1 | 1 | 1 | 1 | 1 | 0 | 0 | 0 |

Row

Column

| | 1 | 2 | 3 | 4 | 5 | 6 | 7 | 8 |
|---|---|---|---|---|---|---|---|---|
| 1 | 1 | 1 | 0 | 0 | 0 | 1 | 1 | 1 |
| 2 | 0 | 0 | 0 | 0 | 0 | 1 | 1 | 1 |
| 3 | 1 | 1 | 1 | 1 | 1 | 1 | 1 | 1 |
| 4 | 1 | 1 | 1 | 1 | 1 | 0 | 0 | 0 |
| 5 | 1 | 1 | 1 | 1 | 1 | 0 | 0 | 0 |
| 6 | 1 | 1 | 1 | 1 | 1 | 0 | 0 | 0 |
| 7 | 1 | 1 | 1 | 1 | 1 | 0 | 0 | 0 |

Row (left label); 295

FIG. 19I

Column

| | 1 | 2 | 3 | 4 | 5 | 6 | 7 | 8 |
|---|---|---|---|---|---|---|---|---|
| 1 | 1 | 1 | 1 | 0 | 1 | 1 | 1 | 1 |
| 2 | 1 | 1 | 1 | 1 | 1 | 1 | 1 | 1 |
| 3 | 1 | 1 | 1 | 1 | 1 | 1 | 1 | 1 |
| 4 | 1 | 1 | 1 | 1 | 1 | 1 | 1 | 1 |
| 5 | 1 | 1 | 1 | 1 | 1 | 1 | 0 | 0 |
| 6 | 1 | 1 | 1 | 1 | 1 | 1 | 0 | 0 |
| 7 | 1 | 1 | 1 | 1 | 1 | 1 | 0 | 0 |

Row (left label); 295

CIRCUITS AND METHODS ALLOWING FOR PIXEL ARRAY EXPOSURE PATTERN CONTROL

CROSS-REFERENCE TO RELATED PATENT APPLICATIONS

This application claims the benefit of U.S. Provisional App. Ser. No. 60/953,905, entitled "CMOS Imager", filed Aug. 3, 2007, and this application also claims the benefit of U.S. Provisional App. Ser. No. 61/020,560, entitled "CMOS Image Sensor for Machine Vision", filed Jan. 11, 2008, the entire contents of both of which are incorporated by reference herein.

BACKGROUND INFORMATION

1. Field of the Invention

Embodiments of the present invention relate generally to image processing systems, image sensor circuits, pixel circuits, image capturing methods, and image processing methods and, in specific embodiments, to an image sensor circuit including a pixel array and one or more circuits for controlling pixel circuits of the pixel array.

2. Related Art

Image sensor circuits are widely used to obtain images of physical scenes and objects. In many instances, image sensor circuits are employed to obtain images that are looked at and viewed by humans. In other instances, image sensor circuits are employed to obtain images that are used in machine vision and other automated pattern recognition processes. Related art image sensor circuits that place an emphasis on realistic depictions of scenes for human viewing may create some problems when used for pattern recognition applications.

Image sensor circuits typically include a pixel array with a plurality of pixel circuits arranged in rows and columns. Each of the pixel circuits typically includes a light sensitive element, such as a photodiode or the like, for sampling light intensity of a corresponding portion of a scene being imaged. During image capture, an accumulation of charge from the light sensitive elements in the pixel circuits of the pixel array is typically controlled in accordance with preset time periods specified for a shutter operation. Two types of shutter operations that are used in various related art image sensor circuits are: (i) a global shutter operation; and (ii) a rolling shutter operation.

In a typical global shutter operation, all pixel circuits in a pixel array are reset and then exposed simultaneously for a specified period of time to capture an image. With such global shutters, all pixel circuits in the pixel array start integrating or accumulating charge from light at a same first time point, and then stop accumulating charge at a same second time point. Thus, with such global shutters, all of the pixel circuits in the pixel array have a same integration time during which charge is accumulated from light for a scene being imaged.

In a typical rolling shutter operation, all pixel circuits in a same row of a pixel array are reset and then exposed simultaneously for a specified period of time. With such rolling shutters, all pixel circuits in a same row of the pixel array start accumulating charge from light at a same first time point, and then stop accumulating charge at a same second time point. Once a row of pixel circuits has been exposed for a specified integration time period in such a rolling shutter operation, the process continues to a next row in the pixel array, where all pixel circuits in the next row are then exposed simultaneously for the specified integration time period. The process then continues row-by-row through the pixel array until all of the rows of pixel circuits have been exposed for the specified integration time period to capture an image.

The global shutter and rolling shutter operations seek to preserve a relative relationship between points of light intensity in a scene, such that if one point in a physical scene is brighter than another point, then the same will be true in the captured image of the physical scene to the extent that the pixel circuits are not completely saturated. This is desirable when the captured images are for human viewing, because the captured images would be captured with the intent to maintain a realistic appearance of the physical scene. However, attempting to preserve a relative relationship between points of light intensity in a scene may lead to problems when capturing an image of a high dynamic range scene for pattern recognition purposes, because a variation in light intensity in the physical scene may exceed a dynamic range of the pixel circuits.

For example, consider a physical scene with a bright center portion and dark edges, such as when looking outside from inside of a dark tunnel on a bright afternoon. In such a case, if an integration time for accumulating charge in a global shutter or rolling shutter operation is set to be a long time so as to accumulate a sufficient amount of charge for the dark areas, then pixel circuits accumulating charge for the bright areas may saturate with charge. Such a saturation of charge may lead to an inability to see objects in the bright areas of the image. On the other hand, if the integration time for accumulating charge in such a case with a global shutter or rolling shutter operation is set to be a short time so as not to saturate the pixel circuits accumulating charge for the bright areas, then pixel circuits accumulating charge for the dark areas may not accumulate enough charge to allow for seeing objects in the dark areas.

The problem of accumulating too much charge or accumulating too little charge as described above can be very serious in the context of automated pattern recognition, because it is difficult and often impossible to recognize an object that cannot be seen in an image. For instance, in the example provided above, if captured images were being used to automatically control a car that is driving in the tunnel, then having a saturation of an image at the exit area of the tunnel may prevent the ability to recognize objects at the exit of the tunnel, which would adversely impact an ability to avoid such objects with the car. Thus, the global shutter and rolling shutter operations may lead to problems in cases of capturing images of high dynamic range scenes that have large differences in light intensity between different areas of the scenes.

FIG. 1 illustrates a block diagram of a prior art image sensor circuit 100. The image sensor circuit 100 includes a pixel array 101, an analog-to-digital converter (ADC) block 102, a digital image processor 103, a row addressing circuit 104, a control processor 105, and an image memory buffer 106. The pixel array 101 includes a plurality of pixel circuits 112 that are arranged in rows and columns. Each pixel circuit 112 includes a light sensitive element, such as a photodiode or the like, for sampling light intensity of a corresponding portion of a scene being imaged, and each pixel circuit 112 is configured to produce an analog pixel signal based on the sampled light intensity.

The pixel array 101 includes row control lines $107_1$, $107_2$, ..., $107_n$, which may each include a plurality of control lines (not shown in FIG. 1), and the pixel array 101 also includes analog output lines $108_1$, $108_2$, ..., $108_m$. The row addressing circuit 104 supplies control signals to the pixel circuits 112 in the pixel array 101 over the row control lines $107_1$, $107_2$, ..., $107_n$ to control an operation of the pixel circuits 112. Pixel circuits 112 that are in a same row of the pixel array 101, such as an $i^{th}$ row of the pixel array 101, share common row control signals over a common row control line $107_i$ from the row addressing circuit 104. Pixel circuits 112 that are in a same column of the pixel array 101, such as a $j^{th}$ column of the pixel array 101, share a common analog output line $108_j$ to provide output. The row addressing circuit 104 controls the pixel circuits 112 to perform processing row by row for a rolling shutter operation.

The analog pixel signals output from the pixel array 101 over the analog output lines $108_1, 108_2, \ldots, 108_m$ are input to the ADC block 102. The ADC block 102 typically includes one column ADC circuit 114 for each column of pixel circuits 112 in the pixel array 101. The column ADC circuits 114 are configured to convert analog pixel signals received from the pixel array 101 over respective ones of the analog output lines $108_1, 108_2, \ldots, 108_m$ into digital signals that are output on corresponding digital output lines $109_1, 109_2, \ldots, 109_m$. The control processor 105 is configured to control an operation of the ADC block 102, and is also configured to control an operation of the row addressing circuit 104. The digital pixel signals output on the digital output lines $109_1, 109_2, \ldots, 109_m$ from the ADC block 102 are input to the digital image processor 103. The digital image processor 103, in cooperation with the image memory buffer 106 and the control processor 105, processes the input digital pixel signals to generate digital output signals on an output line 110.

FIG. 2 illustrates a prior art design for the pixel circuit 112. The pixel circuit 112 includes a photodiode 121, a transfer gate transistor 122, a sense node 131, a reset transistor 124, a drive transistor 125, and a read select transistor 126. The transfer gate transistor 122, the reset transistor 124, the drive transistor 125, and the read select transistor 126 each comprise an N-channel metal oxide semiconductor (NMOS) field effect transistor. A generic one of the row control lines $107_1, 107_2, \ldots, 107_n$ (refer to FIG. 1) is shown in FIG. 2 as a row control line 107, and a generic one of the analog output lines $108_1, 108_2, \ldots, 108_m$ (refer to FIG. 1) is shown in FIG. 2 as an analog output line 108. The row control line 107 includes a row readout signal line 127, a transfer signal line 129, and a reset signal line 130. The pixel circuit 112 receives input signals on the row readout signal line 127, the transfer signal line 129, and the reset signal line 130. The pixel circuit 112 provides output signals on the analog output line 108.

As illustrated in FIG. 2, the photodiode 121 is connected between ground 133 and a first terminal of the transfer gate transistor 122. A second terminal of the transfer gate transistor 122 is connected to the sense node 131, and a gate of the transfer gate transistor 122 is connected to the transfer signal line 129. A first terminal of the reset transistor 124 is connected to a voltage source 132, a second terminal of the reset transistor 124 is connected to the sense node 131, and a gate of the reset transistor 124 is connected to the reset signal line 130. A first terminal of the drive transistor 125 is connected to the voltage source 132, a second terminal of the drive transistor 125 is connected to a first terminal of the read select transistor 126, and a gate of the drive transistor 125 is connected to the sense node 131. A second terminal of the read select transistor 126 is connected to the analog output line 108, and a gate of the read select transistor 126 is connected to the row readout signal line 127.

FIG. 3 illustrates a prior art design for the column ADC circuit 114. The column ADC circuit 114 includes a source transistor 140, a double sampling amplifier 142, and an analog-to-digital converter (ADC) circuit 144. The double sampling amplifier 142 is controlled by control signals provided from the control processor 105 (refer to FIG. 1), which are received by the double sampling amplifier 142 over an amplifier control signal line 146. The ADC circuit 144 is controlled by control signals provided from the control processor 105 (refer to FIG. 1), which are received by the ADC circuit 144 over a converter control signal line 148. A generic one of the analog output lines $108_1, 108_2, \ldots, 108_m$ (refer to FIG. 1) is shown in FIG. 3 as the analog output line 108, and a generic one of the digital output lines $109_1, 109_2, \ldots, 109_m$ (refer to FIG. 1) is shown in FIG. 3 as a digital output line 109. A first terminal of the source transistor 140 is connected to the analog output line 108, and a second terminal of the source transistor 140 is connected to ground 133. An input of the double sampling amplifier 142 is connected to the analog output line 108, and an output of the double sampling amplifier 142 is connected to an input of the ADC circuit 144. An output of the ADC circuit 144 is connected to the digital output line 109.

FIG. 4 illustrates the prior art image sensor circuit 100 of FIG. 1, in which the pixel circuit 112 of FIG. 2 and the column ADC circuit 114 of FIG. 3 are depicted. An operation of the image sensor circuit 100 is now described with reference to FIGS. 1, 2, 3, and 4. When an image capture operation is initiated, photodiode 121 is reset by providing both a HIGH signal on the transfer signal line 129 to turn on the transfer gate transistor 122 and a HIGH signal on the reset signal line 130 to turn on the reset transistor 124. A LOW signal is then provided on the reset signal line 130 to turn off the reset transistor 124, while the transfer gate transistor 122 remains on to allow charge generated in the photodiode 121 to accumulate in the sense node 131. At an end of an exposure time interval, a LOW signal is provided on the transfer signal line 129 to turn off the transfer gate transistor 122.

Once the transfer gate transistor 122 has been turned off or closed, a HIGH signal is provided on the row readout signal line 127 to turn on the read select transistor 126, and the double sampling amplifier 142 samples a pixel circuit output voltage on the analog output line 108. Then, a LOW signal is provided on the row readout signal line 127 to turn off the read select transistor 126, and a HIGH signal is provided on both the reset signal line 130 and the transfer signal line 129 to turn on the reset transistor 124 and the transfer gate transistor 122, so as to reset the sense node 131. When the sense node 131 is in a reset state, a HIGH signal is provided on the row readout signal line 127 to turn on the read select transistor 126, and the double sampling amplifier 142 samples a pixel circuit reset voltage on the analog output line 108. The double sampling amplifier 142 then computes a difference between the pixel circuit output voltage and the pixel circuit reset voltage to arrive at a corrected pixel circuit output voltage. The corrected pixel circuit output voltage is provided from the double sampling amplifier 142 to the ADC circuit 144, and the ADC circuit 144 converts the corrected pixel circuit output voltage to a digital signal and provides the digital signal to the digital image processor 103.

In the image sensor circuit 100, all pixel circuits 112 in a given row of the pixel array 101 accumulate charge for an equal amount of time. Thus, the image sensor circuit 100 has problems as discussed above when capturing an image of a high dynamic range scene for pattern recognition purposes, because a variation in light intensity in the physical scene may exceed a dynamic range of the pixel circuits 112. Such problems may prevent objects or patterns from being recognized in images captured by the image sensor circuit 100.

SUMMARY OF THE DISCLOSURE

Various embodiments of the present invention allow for controlling an exposure pattern of a pixel array over time during an image capture operation, such that pixel circuits in the pixel array may be exposed for different amounts of time during the image capture operation. In various embodiments, the exposure pattern of the pixel array is controlled based at least partially on signals output from the pixel array that are indicative of charge accumulated in at least a portion of the pixel array. In some embodiments, the exposure pattern of the pixel array is iteratively updated during an image capture operation based on charge that has already accumulated in the pixel array during the image capture operation.

An image sensor circuit in accordance with an embodiment of the present invention includes a pixel array and one or more circuits. The pixel array comprises a plurality of pixel circuits. The one or more circuits are configured to update exposure information based at least partially on one or more signals output from the pixel array, and are configured to control an exposure pattern of the pixel array based on the exposure information. In various embodiments, the one or more circuits are configured to iteratively update the exposure information while an image is being captured by the pixel array based at least partially on the one or more signals output from the pixel array and at least one dilation rule. In some embodiments, the at least one dilation rule is specified by at least one structuring element.

In various embodiments, the plurality of pixel circuits are controllable such that at least one pixel circuit in a row of the pixel array can integrate charge at a sense node of the pixel circuit while at least a second pixel circuit in the row is prevented from integrating charge at a sense node of the second pixel circuit during at least a portion of an image capture operation. In some embodiments, the one or more circuits are configured to iteratively update the exposure information based at least partially on values of the one or more signals output from the pixel array, where the values of the one or more signals are indicative of charge accumulated in at least a portion of the pixel array.

In various embodiments, the one or more circuits are configured to individually control exposure states of the plurality of pixel circuits based on the exposure information so as to control the exposure pattern of the pixel array. Also, in various embodiments, the exposure states for each pixel circuit of the plurality of pixel circuits include an on-state in which the pixel circuit is allowed to integrate charge at a sense node of the pixel circuit and an off-state in which the pixel circuit is prevented from integrating additional charge at the sense node.

In some embodiments, the image sensor circuit further comprises one or more memory devices for storing the exposure information as exposure pattern data including at least one bit for each pixel circuit of the plurality of pixel circuits to be used for controlling an exposure state of the pixel circuit. In further embodiments, the one or more circuits are configured to reset the exposure pattern data stored in the one or more memory devices to an initial pattern prior to an image capture operation. In some embodiments, the one or more circuits are configured to change the exposure pattern of the pixel array a plurality of times while an image is being captured by the pixel array based on the exposure information.

In various embodiments, at least one pixel circuit of the plurality of pixel circuits comprises a light sensing element, a first transistor, and a second transistor. The first transistor has a terminal connected to the light sensing element. The second transistor is connected between an exposure control signal line and a gate of the first transistor. In various embodiments, the one or more circuits are configured to control a signal on the exposure control signal line based on the exposure information. In some embodiments, the at least one pixel circuit further comprises a third transistor and a fourth transistor. The third transistor is connected to the light sensing element. The fourth transistor is connected between an anti-blooming control signal line and a gate of the third transistor. The one or more circuits are configured to control an anti-blooming signal on the anti-blooming control signal line based on the exposure information.

In various embodiments, the one or more circuits are configured to control the anti-blooming signal on the anti-blooming control signal line to be an opposite value of the exposure control signal on the exposure control signal line during an image capture operation. Also, in various embodiments, the light sensing element has a first portion that extends below the exposure control signal line and a second portion that extends below the anti-blooming control signal line. In some embodiments, the at least one pixel circuit further comprises one or more dummy diffusions that are connected to a constant voltage during an image capture operation.

In some embodiments, the at least one pixel circuit further comprises a reset transistor. The reset transistor is connected between a fixed voltage and a sense node, where a voltage at the sense node controls an output signal. In various embodiments, the one or more circuits are configured to control a reset signal that is applied to a gate of the reset transistor such that the reset transistor remains off during and between at least two readouts of the output signal during an image capture operation so as to render the at least two readouts of the output signal nondestructive with respect to charge accumulating at the sense node.

In various embodiments, the pixel array further comprises a plurality of column readout lines for providing the one or more signals, and the one or more circuits are configured to selectively control signals on the plurality of column readout lines to be either voltage signals or current signals. In some embodiments, the one or more signals are analog current signals during at least some portion of time during an image capture operation. In various embodiments, the image sensor circuit further comprises a column analog-to-digital converter circuit that is configured to receive analog signals output on a column readout line of the pixel array from two or more pixel circuits of the plurality of pixel circuits that are in a same column of the pixel array, and that is configured to convert the analog signals to corresponding digital signals.

In various embodiments, the plurality of pixel circuits are arranged in a plurality of rows and a plurality of columns. In some embodiments, the one or more circuits are configured to selectively control the pixel array to provide output from pixel circuits in two or more rows and two or more columns at a same time such that the outputs from the two or more rows combine in analog form on column readout lines of the pixel array.

In some embodiments, the image sensor circuit further comprises a resistive grid. In various embodiments, the resistive grid includes a plurality of switchable resistors and a plurality of capacitors. In some embodiments, the plurality of capacitors are connected to receive signals having values based on the one or more signals output from the pixel array, and the plurality of switchable resistors are configured to selectively connect the plurality of capacitors in accordance with command signals. In various embodiments, the one or more circuits are configured to sample a voltage stored in at least one of the plurality of capacitors in a case where the plurality of switchable resistors have been controlled to connect the plurality of capacitors and a time period has elapsed. Also, in various embodiments, the one or more circuits are configured to update the exposure information based on the voltage.

In some embodiments, the plurality of pixel circuits are arranged in a plurality of rows and a plurality of columns, where each of the plurality of rows further includes a threshold current generator. In various embodiments, the one or more circuits are configured to compare a voltage of a reference signal derived from an output of a particular threshold current generator in a particular row of the plurality of rows with a voltage of a signal derived from an output of a particular pixel circuit of the plurality of pixel circuits that is in the particular row, and are configured to update the exposure information based on a result of the comparison. In some embodiments, the one or more circuits are configured to terminate an image capture operation in the pixel array based on a comparison between a threshold number and a number calculated from the exposure information. Also, in some embodiments, the one or more circuits comprise a digital signal processor. In various embodiments, the image sensor circuit further comprises an infrared filter located on at least a portion of at least one pixel circuit of the plurality of pixel circuits. In some embodiments, the image sensor circuit further comprises a color filter located on at least a portion of at least one pixel circuit of the plurality of pixel circuits.

A method in an image sensor circuit in accordance with an embodiment of the present invention includes (a) storing information related to an exposure pattern of a pixel array of the image sensor circuit; and (b) changing the exposure pattern of the pixel array based at least partially on (i) the information that has been stored and (ii) one or more signals output from the pixel array.

A method in an image sensor circuit in accordance with an embodiment of the present invention includes (a) starting an integration of charge in each of a plurality of pixel circuits of a pixel array of the image sensor circuit; (b) preventing the integration of charge in at least a particular pixel circuit of the plurality of pixel circuits that is selected based at least partially on one or more signals output from the pixel array; and (c) preventing the integration of charge in at least one pixel circuit of the plurality of pixel circuits that is adjacent to the particular pixel circuit in the pixel array based at least partially on a dilation rule.

A pixel circuit in accordance with an embodiment of the present invention includes a light sensitive element, a first transistor, and a second transistor. In various embodiments, the light sensitive element comprises a photodiode or the like. The first transistor is connected between the light sensitive element and a sense node. The second transistor is connected between an exposure control signal line and a gate of the first transistor, and the second transistor has a gate connected to a transfer signal line.

An image processing system in accordance with an embodiment of the present invention includes an image sensor circuit and a processor. The image sensor circuit comprises a pixel array and is configured to obtain an image using a type of shutter operation in which an exposure pattern of the pixel array is set according to exposure information that changes over time based at least partially on charge accumulated in at least a portion of the pixel array. The processor is configured to detect one or more objects in the image. In various embodiments, the exposure information changes over time based further on a dilation rule specified by a structuring element. In various embodiments, the image sensor circuit and the processor are both located on a single chip.

Various embodiments of the present invention allow for controlling a pixel array using feedback, such that the pixel array is controlled based at least partially on signals output from the pixel array that are indicative of charge that has already accumulated in at least a portion of the pixel array during an image capture operation. Also, various embodiments of the present invention allow for controlling a duration of integration time at an individual pixel circuit level, such that pixel circuits in a same row of the pixel array may each integrate charge for different amounts of time during an image capture operation. In various embodiments, a particular shutter operation allows for causing pixel circuits that are integrating charge for a bright area of a physical scene to integrate charge for a shorter integration time than an integration time of pixel circuits that are integrating charge for darker areas of the physical scene. Therefore, various embodiments of the present invention provide for controlling an amount of time that individual pixel circuits are allowed to accumulate charge during an image capture operation based at least partially on charge already accumulated by pixel circuits during the image capture operation.

BRIEF DESCRIPTION OF THE DRAWINGS

FIG. 17 illustrates a flowchart of a method in an image sensor circuit in accordance with an embodiment of the present invention;

FIG. 19A illustrates an example of contents of an exposure pattern buffer in accordance with an embodiment of the present invention;

FIG. 19B illustrates an example of an exposure pattern of a pixel array that is set according to the contents of the exposure pattern buffer of FIG. 19A in accordance with an embodiment of the present invention;

FIG. 19C illustrates an example of contents of an exposure pattern buffer in accordance with an embodiment of the present invention;

FIG. 19D illustrates an example of contents of an exposure pattern buffer in accordance with an embodiment of the present invention;

FIG. 19E illustrates an example of an exposure pattern of a pixel array that is set according to the contents of the exposure pattern buffer of FIG. 19D in accordance with an embodiment of the present invention;

FIG. 19F illustrates an example of contents of an exposure pattern buffer in accordance with an embodiment of the present invention;

FIG. 19G illustrates an example of contents of an exposure pattern buffer in accordance with an embodiment of the present invention;

FIG. 19H illustrates an example of an exposure pattern of a pixel array that is set according to the contents of the exposure pattern buffer of FIG. 19G in accordance with an embodiment of the present invention;

FIG. 19I illustrates an example of contents of an exposure pattern buffer in accordance with an embodiment of the present invention;

FIG. 19J illustrates an example of contents of an exposure pattern buffer in accordance with an embodiment of the present invention;

FIG. 19K illustrates an example of an exposure pattern of a pixel array that is set according to the contents of the exposure pattern buffer of FIG. 19J in accordance with an embodiment of the present invention;

DETAILED DESCRIPTION OF ILLUSTRATIVE EMBODIMENTS

Figure 1:
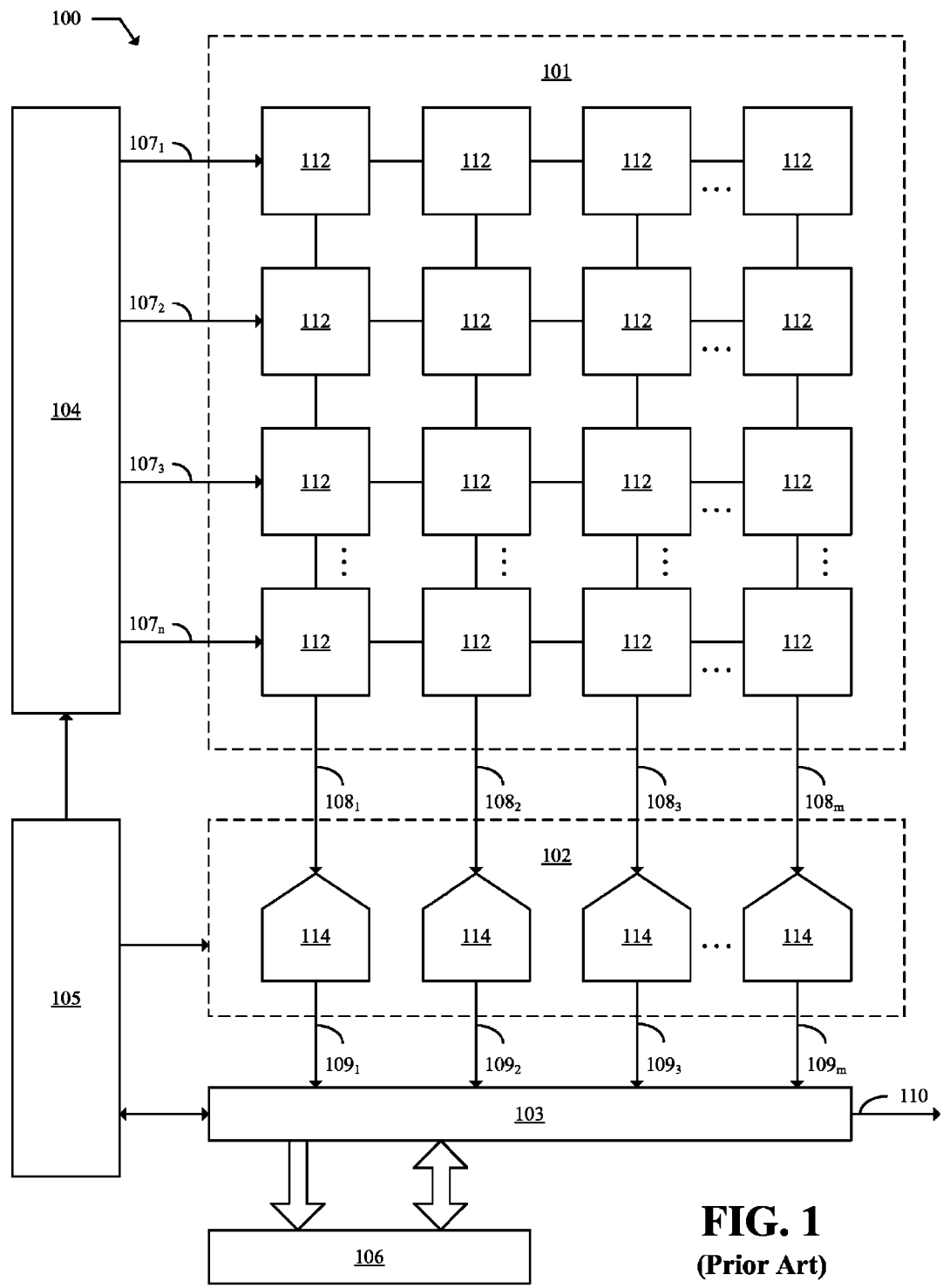
FIG. 1 illustrates a prior art image sensor circuit.
Figure 2:
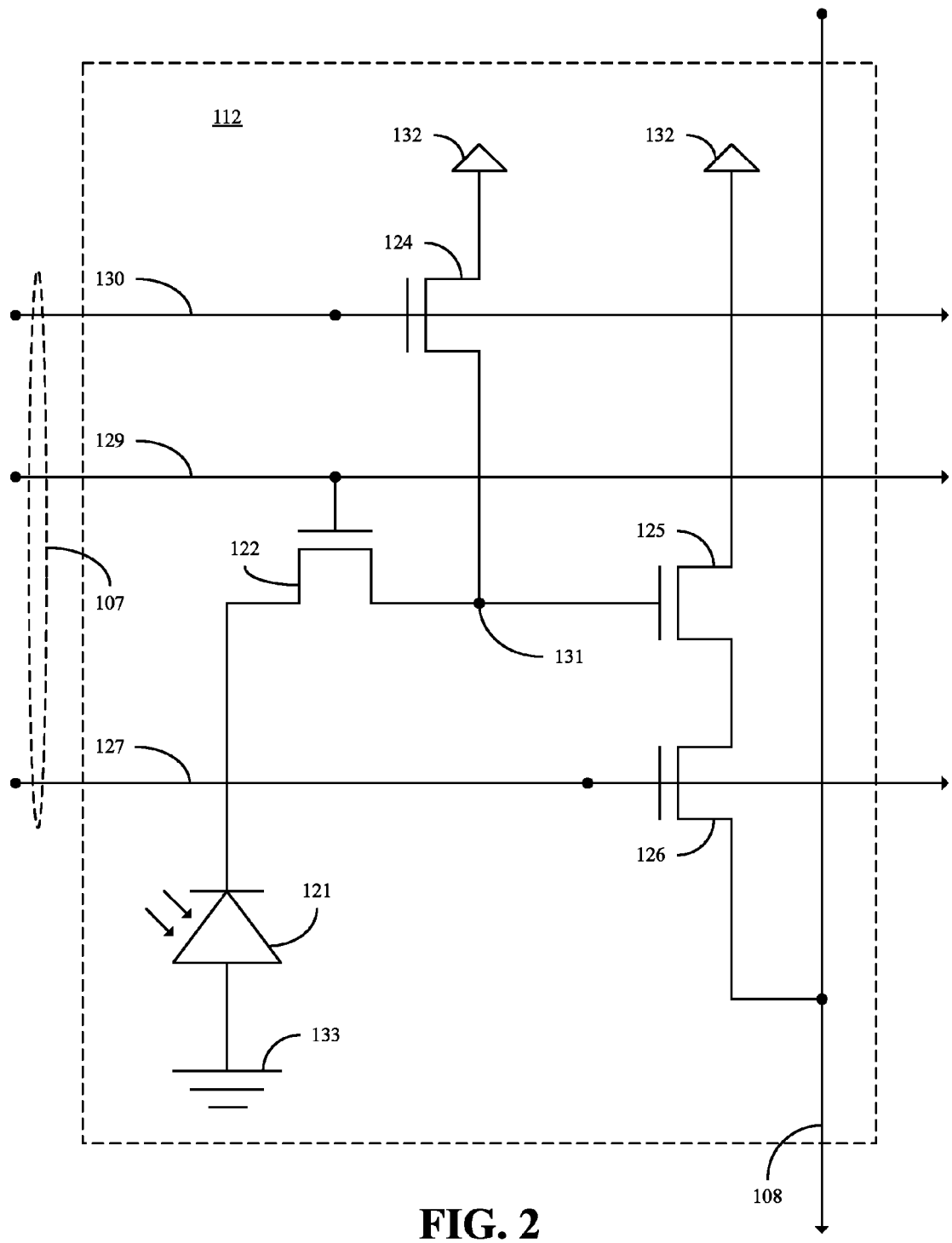
FIG. 2 illustrates a prior art pixel circuit.
Figure 3:
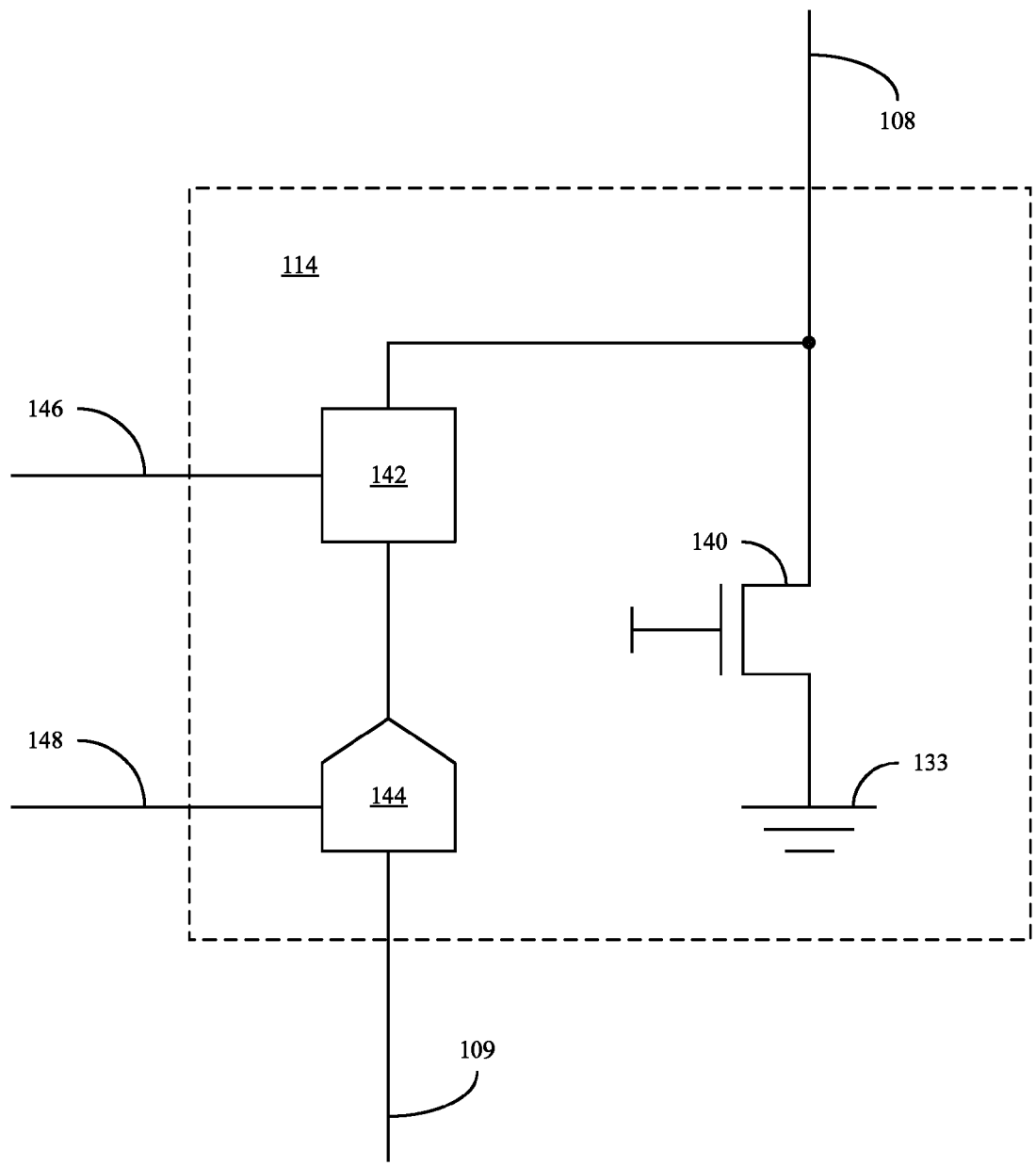
FIG. 3 illustrates a prior art column analog-to-digital converter (ADC) circuit.
Figure 4:
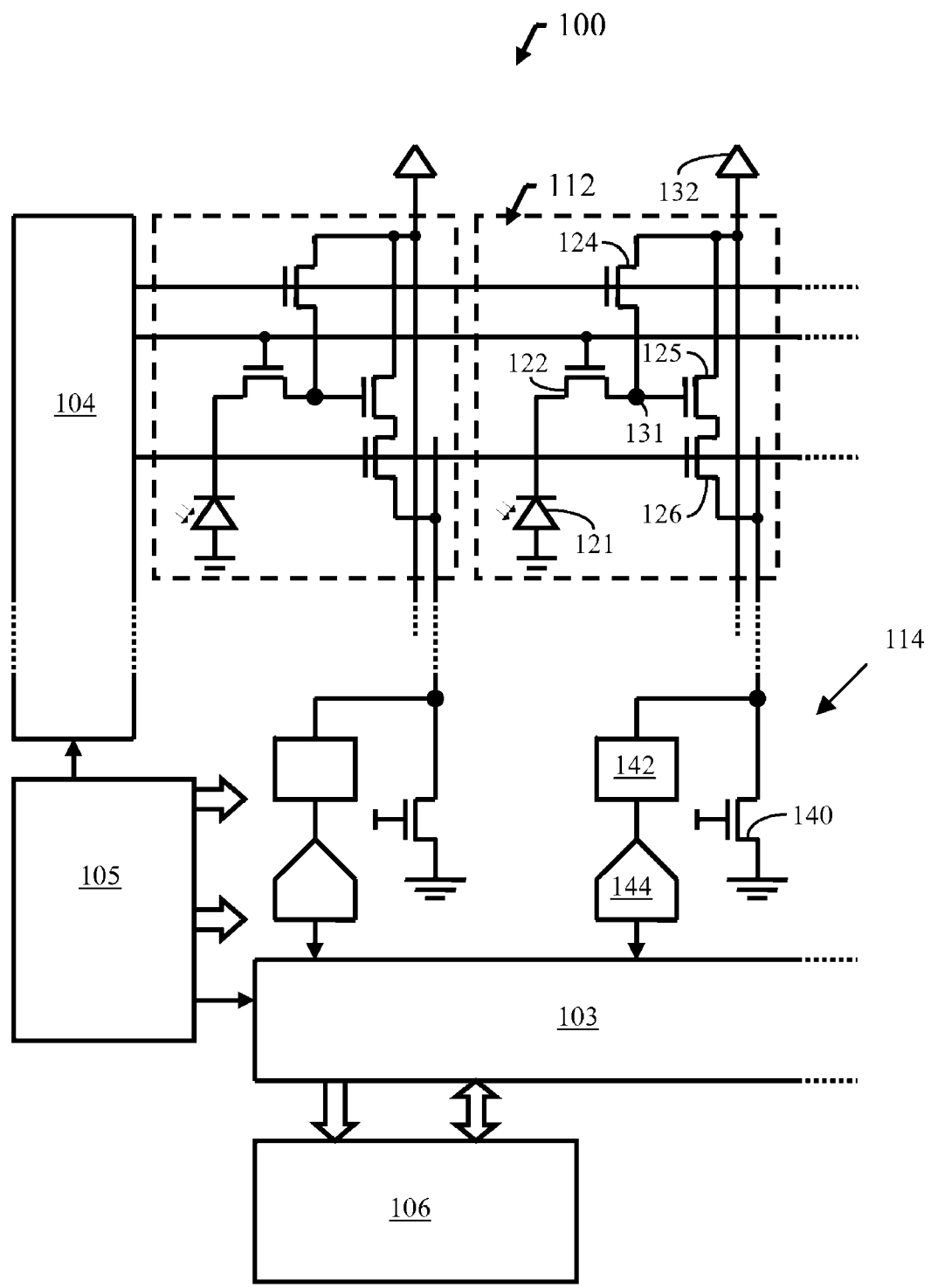
FIG. 4 illustrates a prior art image sensor circuit.
Figure 5:
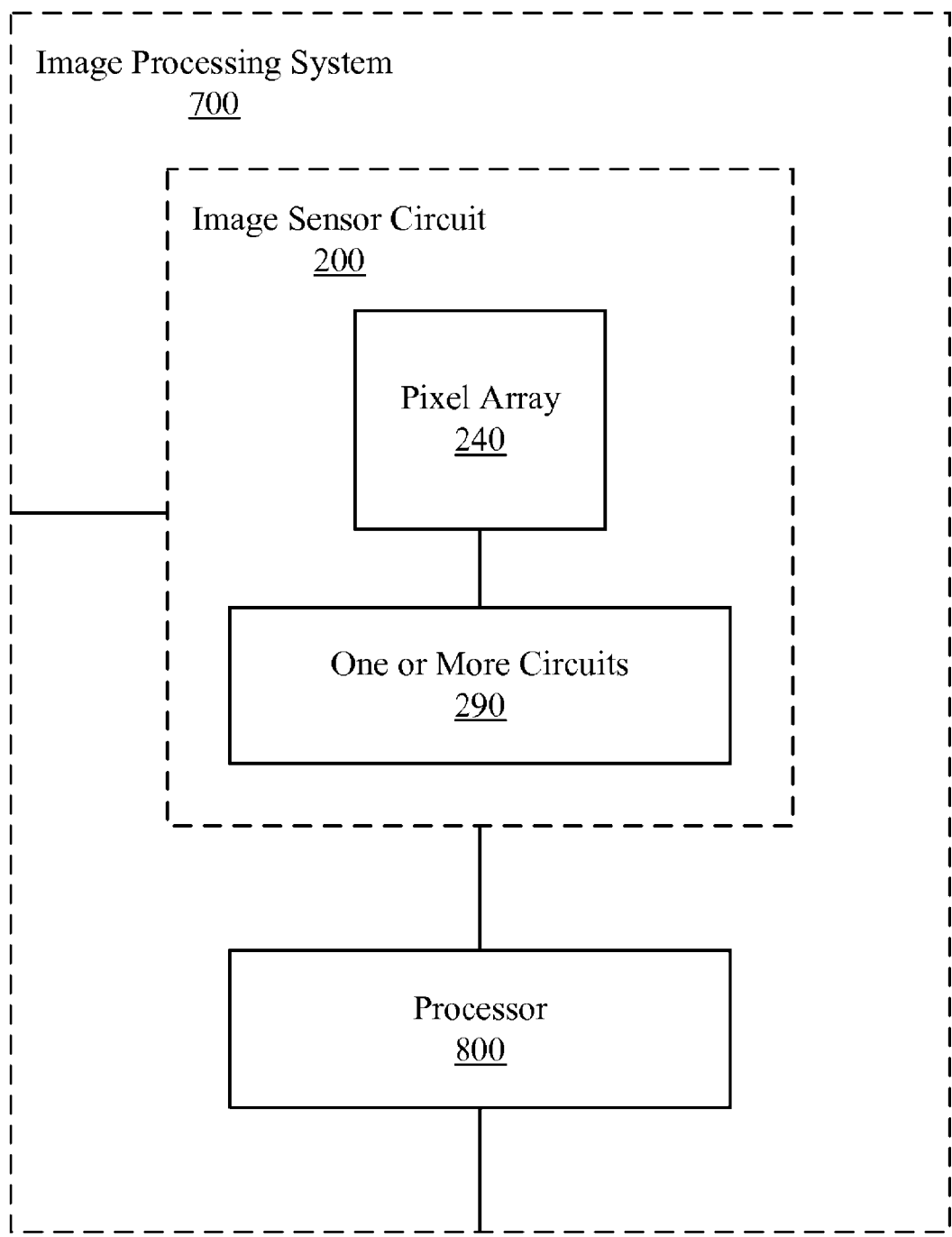
FIG. 5 illustrates an image processing system in accordance with an embodiment of the present invention.

FIG. 5 illustrates a block diagram of an image processing system 700 in accordance with an embodiment of the present invention. The image processing system 700 includes an image sensor circuit 200 and a processor 800. The image sensor circuit 200 includes a pixel array 240 and one or more circuits 290. In various embodiments, the image sensor circuit 200 and the processor 800 are both located on a single chip. In various embodiments, the image sensor circuit 200 allows for capturing images of physical scenes, and the processor 800 is configured to process the images captured by the image sensor circuit 200. In some embodiments, the processor 800 is configured to receive data for an image from the image sensor circuit 200 and is configured to processes the data to detect one or more objects in the image. In various embodiments, the image processing system 700 may be used for machine vision or other automated pattern recognition applications. In some embodiments, the image processing system 700 may be used to obtain images for human viewing.

In some embodiments, the processor 800 may include circuitry for performing pattern matching to detect one or more objects, such as circuitry disclosed in U.S. Provisional Patent App. Ser. No. 60/991,545, entitled "Vision System on a Chip", filed Nov. 30, 2007, the entire contents of which are incorporated by reference herein. In some embodiments, the processor 800 is configured to search an image for one or more features that represent an object using a model of the one or more features. Also, in some such embodiments, the processor 800 may be configured to perform a method to detect objects by searching for features in an image, such as a method including steps 802-810 in the flowchart of FIG. 8 of U.S. Provisional Patent App. Ser. No. 60/991,545.

Figure 6:
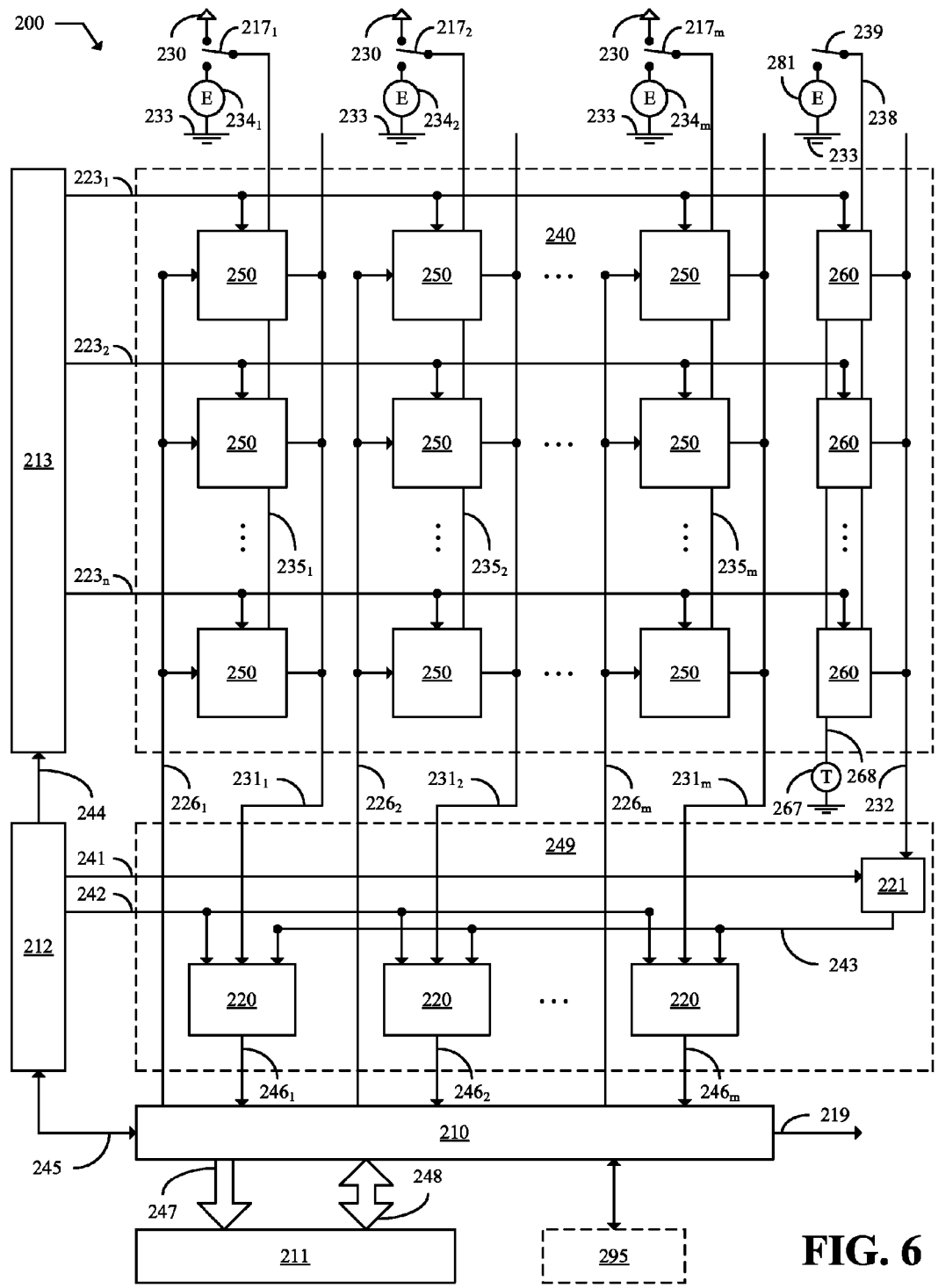
FIG. 6 illustrates an image sensor circuit in accordance with an embodiment of the present invention.

FIG. 6 illustrates the image sensor circuit 200 in accordance with an embodiment of the present invention. The image sensor circuit 200 includes the pixel array 240, an analog-to-digital converter (ADC) block 249, a pixel control signal generator 213, a control processor 212, a digital image processor 210, and an image memory buffer 211. In some embodiments, the image sensor circuit 200 further includes an exposure pattern buffer 295. The pixel array 240 includes a plurality of pixel circuits 250 that are arranged in rows and columns. For example, in various embodiments, the pixel array 240 may include "n" rows and "m" columns of pixel circuits 250, where n and m are integer values. Each pixel circuit 250 includes a light sensing element, such as a photodiode or the like, for sampling light intensity of a corresponding portion of a scene being imaged. In various embodiments, the pixel array 240 further includes a plurality of threshold current generators 260 that are arranged in a column. Each threshold current generator 260 may be associated with a corresponding row of pixel circuits 250 in the pixel array 240, and may be configured to provide a reference signal for the corresponding row to be used for signal comparisons.

The pixel array 240 includes row control lines $223_1$, $223_2, \ldots, 223_n$, which may each include a plurality of control lines (not shown in FIG. 6), and the pixel array 240 also includes column readout lines $231_1, 231_2, \ldots, 231_m$. The pixel control signal generator 213 is configured to supply control signals to the pixel circuits 250 in the pixel array 240 over the row control lines $223_1, 223_2, \ldots, 223_n$ to control operations of the pixel circuits 250. In various embodiments, pixel circuits 250 that are in a same row of the pixel array 240, such as an $i^{th}$ row of the pixel array 240, share common row control signals over a common row control line $223_i$ from the pixel control signal generator 213. Also, in various embodiments, pixel circuits 250 that are in a same column of the pixel array 240, such as a $j^{th}$ column of the pixel array 240, share a common column readout line $231_j$ to provide output. In various embodiments, the pixel array 240 further includes a reference signal line 232 over which each of the plurality of threshold current generators 260 are able to provide output.

Analog signals output from the pixel array 240 over the column readout lines $231_1, 231_2, \ldots, 231_m$ are input to the ADC block 249. In various embodiments, the ADC block 249 includes one or more column ADC circuits 220 for each column of pixel circuits 250 in the pixel array 240. In various embodiments, the column ADC circuits 220 are configured to convert analog signals received from the pixel array 240 over respective ones of the column readout lines $231_1, 231_2, \ldots, 231_m$ into digital signals that are output on corresponding digital output lines $246_1, 246_2, \ldots, 246_m$. In various embodiments, the ADC block 249 further includes a reference signal converter 221 for receiving signals on the reference signal line 232 from the pixel array 240, and for providing reference signals on a reference voltage line 243 to each of the plurality of column ADC circuits 220 of the ADC block 249. In various embodiments, the ADC block 249 includes one or more control lines 241 over which the control processor 212 supplies control signals to control operations of the reference signal converter 221. Also, in various embodiments, the ADC block 249 includes one or more control lines 242 over which the control processor 212 supplies control signals to control operations of the plurality of column ADC circuits 220.

In various embodiments, the control processor 212 is configured to control operations of the ADC block 249, and is also configured to control operations of the pixel control signal generator 213. In various embodiments, the control processor 212 provides control signals to the pixel control signal generator 213 over one or more control lines 244. The digital signals output on the digital output lines $246_1$, $246_2$, ..., $246_m$ from the ADC block 249 are input to the digital image processor 210. The image sensor circuit 200 further includes pixel control signal lines $226_1$, $226_2$, ..., $226_m$, which may each include a plurality of control lines (not shown in FIG. 6). The digital image processor 210 is configured to provide control signals to the pixel circuits 250 in the pixel array 240 over the pixel control signal lines $226_1$, $226_2$, ..., $226_m$. In various embodiments, pixel circuits 250 that are in a same column of the pixel array 240, such as a $j^{th}$ column of the pixel array 240, share a common pixel control signal line $226_j$ over which control signals are transmitted from the digital image processor 210.

In various embodiments, the digital image processor 210 communicates with the control processor 212 over one or more communication lines 245. Also, in various embodiments, the digital image processor 210 reads data from the image memory buffer 211 and write data to the image memory buffer 211 over a read/write bus 248. In some embodiments, a separate write bus 247 allows for transferring data from the digital image processor 210 to the image memory buffer 211. In various embodiments, the digital image processor 210 is configured to process digital signals received over the digital output lines $246_1$, $246_2$, ..., $246_m$ from the ADC block 249 and to generate output signals on one or more output lines 219. In various embodiments, the image memory buffer 211 comprises a random access memory (RAM), or the like, for storing and retrieving data. In some embodiments, the image sensor circuit 200 includes the exposure pattern buffer 295, and the digital image processor 210 is able to read from and write to the exposure pattern buffer 295. In various embodiments, the exposure pattern buffer 295 comprises a RAM, or the like.

Various embodiments of the image sensor circuit 200 allow for selecting between (i) a current-analog mode in which signals output on the column readout lines $231_1$, $231_2$, ..., $231_m$ are analog current signals; and (ii) a voltage-analog mode in which signals output on the column readout lines $231_1$, $231_2$, ..., $231_m$ are analog voltage signals. In various embodiments, the image sensor circuit 200 further includes a voltage source 230, a plurality of bias voltage sources $234_1$, $234_2$, ..., $234_m$, and a plurality of voltage source switches $217_1$, $217_2$, ..., $217_m$ such as analog switches or the like. Also, in various embodiments, the pixel array 240 further includes a plurality of voltage source lines $235_1$, $235_2$, ..., $235_m$. In various embodiments, pixel circuits 250 that are in a same column of the pixel array 240, such as a $j^{th}$ column of the pixel array 240, share a common voltage source line $235_j$, and the voltage source line $235_j$ for the column is connected to a corresponding voltage source switch $217_j$ of the plurality of voltage source switches $217_1$, $217_2$, ..., $217_m$. In various embodiments, the control processor 212 is configured to control each of the plurality of voltage source switches $217_1$, $217_2$, ..., $217_m$ to controllably switch between a terminal of the voltage source 230 and a first terminal of a corresponding one of the bias voltage sources $234_1$, $234_2$, ..., $234_m$. In various embodiments, a second terminal of each of the bias voltage sources $234_1$, $234_2$, ..., $234_m$ is connected to ground 233.

In various embodiments, the pixel array 240 further includes a voltage source line 238 connected to each of the plurality of threshold current generators 260. Also, in various embodiments, the image sensor circuit 200 further includes a bias voltage source 281, and a switch 239 connected to the voltage source line 238. In various embodiments, the control processor 212 is configured to control the switch 239 to controllably switch between a first terminal of the bias voltage source 281 and a disconnect state. Also, in various embodiments, a second terminal of the bias voltage source 281 is connected to ground 233. In various embodiments, the pixel array 240 further includes a threshold voltage line 268 connected to each of the plurality of threshold current generators 260. Also, in various embodiments, the image sensor circuit 200 further includes a threshold voltage source 267 with a first terminal connected to the threshold voltage line 268 and a second terminal connected to ground.

Referring to FIGS. 5 and 6, in various embodiments, the one or more circuits 290 include the digital image processor 210. In some embodiments, the digital image processor 210 comprises a digital signal processor that is programmable, or the like. In some embodiments, the one or more circuits 290 further include the pixel control signal generator 213. In some embodiments, the one or more circuits 290 further include the control processor 212. In various embodiments, the one or more circuits 290 further include the ADC block 249. Also, in various embodiments, the one or more circuits 290 further include the plurality of bias voltage sources $234_1$, $234_2$, ..., $234_m$, the plurality of voltage source switches $217_1$, $217_2$, ..., $217_m$, the bias voltage source 281, the switch 239, and the threshold voltage source 267.

Figure 7:
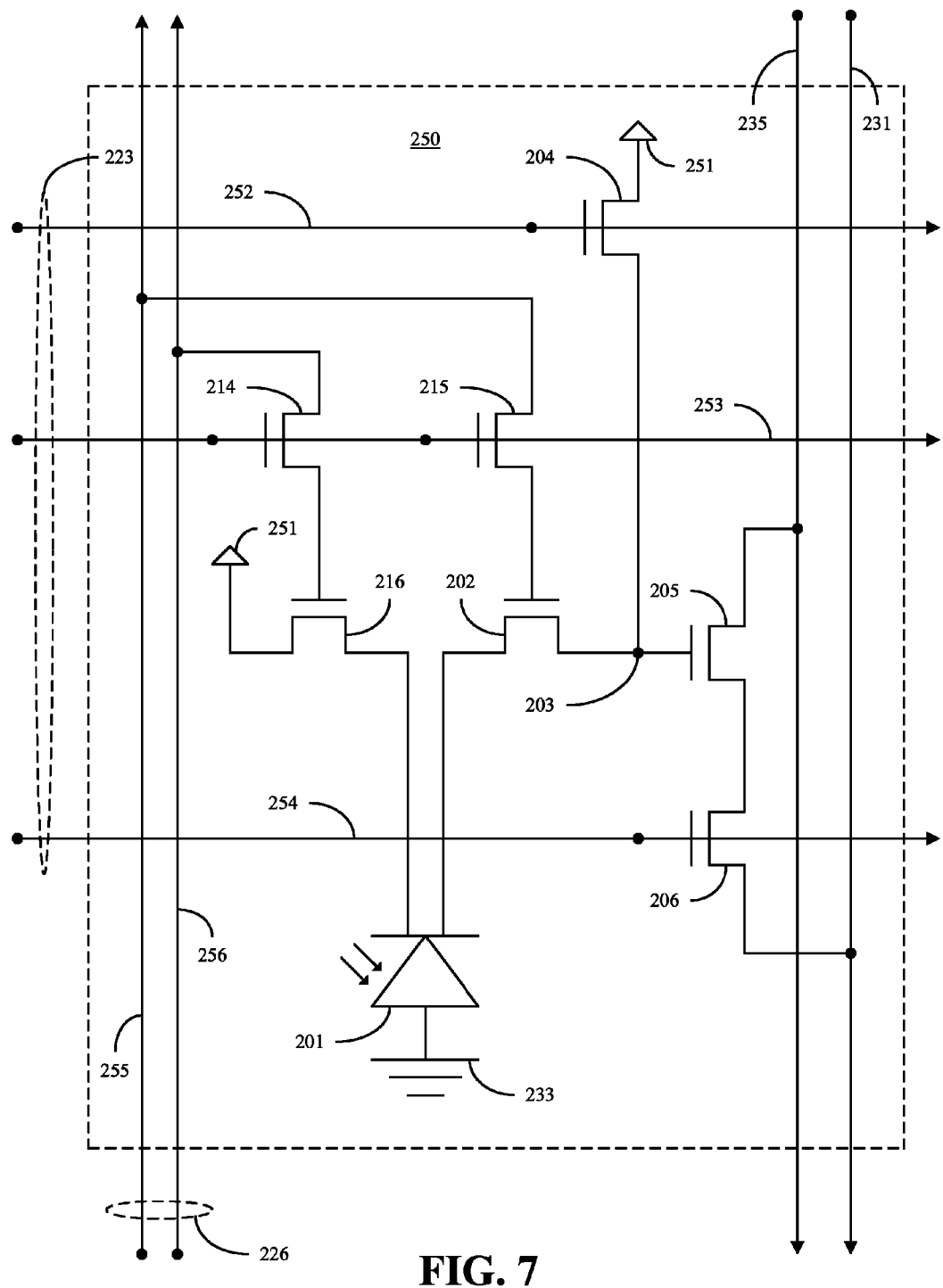
FIG. 7 illustrates a pixel circuit in accordance with an embodiment of the present invention.

FIG. 7 illustrates the pixel circuit 250 in accordance with an embodiment of the present invention. The pixel circuit 250 includes a photodetector or light sensing element, such as a photodiode 201, or the like. The pixel circuit 250 further includes a transfer gate transistor 202, a sense node 203 such as a floating diffusion node, a reset transistor 204, a drive transistor 205, a read select transistor 206, an anti-blooming gate transistor 216, a first write select transistor 214, and a second write select transistor 215. In various embodiments, the transfer gate transistor 202, the reset transistor 204, the drive transistor 205, the read select transistor 206, the anti-blooming gate transistor 216, the first write select transistor 214, and the second write select transistor 215 may each comprise an N-channel metal oxide semiconductor (NMOS) field effect transistor, or the like. The sense node 203 has a particular capacitance and is able to store some electric charge.

An example one of the row control lines $223_1$, $223_2$, ..., $223_n$ (refer to FIG. 6) is shown in FIG. 7 as a row control line 223. In various embodiments, the row control line 223 includes a row readout signal line 254, a transfer signal line 253, and a reset signal line 252. In various embodiments, the pixel circuit 250 receives input signals on the row readout signal line 254, the transfer signal line 253, and the reset signal line 252. An example one of the pixel control signal lines $226_1$, $226_2$, ..., $226_m$ (refer to FIG. 6) is shown in FIG. 7 as a pixel control signal line 226. In various embodiments, the pixel control signal line 226 includes an exposure control signal line 255 and an anti-blooming control signal line 256. In various embodiments, the pixel circuit 250 receives input signals on the exposure control signal line 255 and the anti-blooming control signal line 256. An example one of the voltage source lines $235_1$, $235_2$, ..., $235_m$ (refer to FIG. 6) is shown in FIG. 7 as a voltage source line 235. In various embodiments, the pixel circuit 250 receives an input voltage signal over the voltage source line 235. An example one of the column readout lines $231_1, 231_2, \ldots, 231_m$ (refer to FIG. 6) is shown in FIG. 7 as a column readout line 231. In various embodiments, the pixel circuit 250 provides output signals on the column readout line 231.

As illustrated in an embodiment of the pixel circuit 250 in FIG. 7, an anode of the photodiode 201 is connected to ground 233, and a cathode of the photodiode 201 is connected to a first terminal of the transfer gate transistor 202 and to a first terminal of the anti-blooming gate transistor 216. A second terminal of the transfer gate transistor 202 is connected to the sense node 203, and a gate of the transfer gate transistor 202 is connected to a first terminal of the second write select transistor 215. A first terminal of the reset transistor 204 is connected to a voltage source 251, a second terminal of the reset transistor 204 is connected to the sense node 203, and a gate of the reset transistor 204 is connected to the reset signal line 252. A first terminal of the drive transistor 205 is connected to the voltage source line 235, a second terminal of the drive transistor 205 is connected to a first terminal of the read select transistor 206, and a gate of the drive transistor 205 is connected to the sense node 203. A second terminal of the read select transistor 206 is connected to the column readout line 231, and a gate of the read select transistor 206 is connected to the row readout signal line 254.

A second terminal of the anti-blooming gate transistor 216 is connected to the voltage source 251, and a gate of the anti-blooming gate transistor 216 is connected to a first terminal of the first write select transistor 214. A second terminal of the first write select transistor 214 is connected to the anti-blooming control signal line 256, and a gate of the first write select transistor 214 is connected to the transfer signal line 253. A second terminal of the second write select transistor 215 is connected to the exposure control signal line 255, and a gate of the second write select transistor 215 is connected to the transfer signal line 253.

Figure 8:
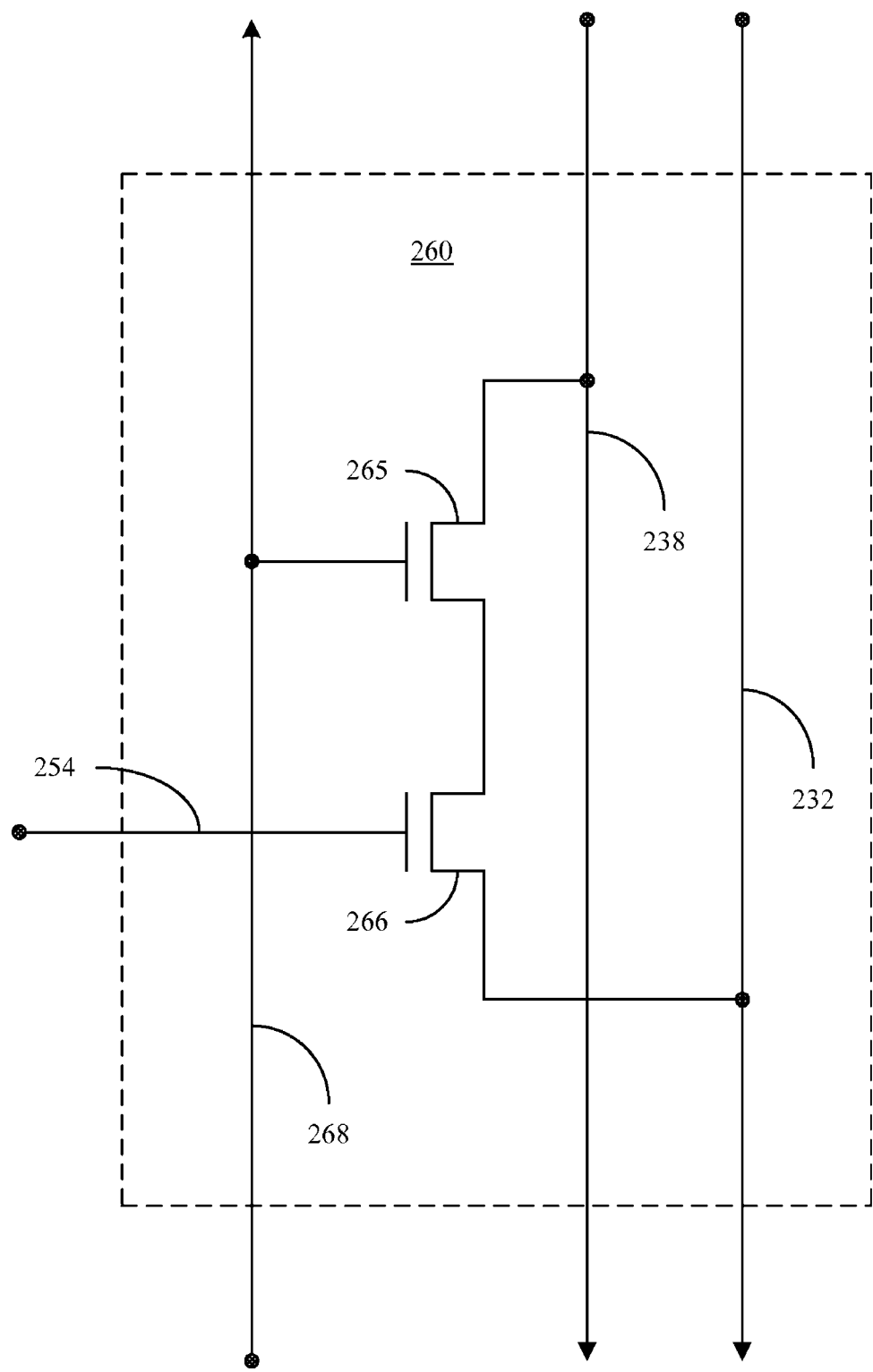
FIG. 8 illustrates a threshold current generator in accordance with an embodiment of the present invention.

FIG. 8 illustrates the threshold current generator 260 in accordance with an embodiment of the present invention. The threshold current generator 260 includes a current control transistor 265 and a select transistor 266. In various embodiments, the current control transistor 265 and the select transistor 266 each comprise an NMOS field effect transistor, or the like. The row readout signal line 254 of an example one of the row control lines $223_1, 223_2, \ldots, 223_n$ (refer to FIG. 6) is shown in FIG. 8 as connected to the threshold current generator 260. As illustrated in an embodiment of the threshold current generator 260 in FIG. 8, a first terminal of the current control transistor 265 is connected to the voltage source line 238. A gate of the current control transistor 265 is connected to the threshold voltage line 268, and a second terminal of the current control transistor 265 is connected to a first terminal of the select transistor 266. A gate of the select transistor 266 is connected to the row readout signal line 254, and a second terminal of the select transistor 266 is connected to the reference signal line 232.

Figure 9:
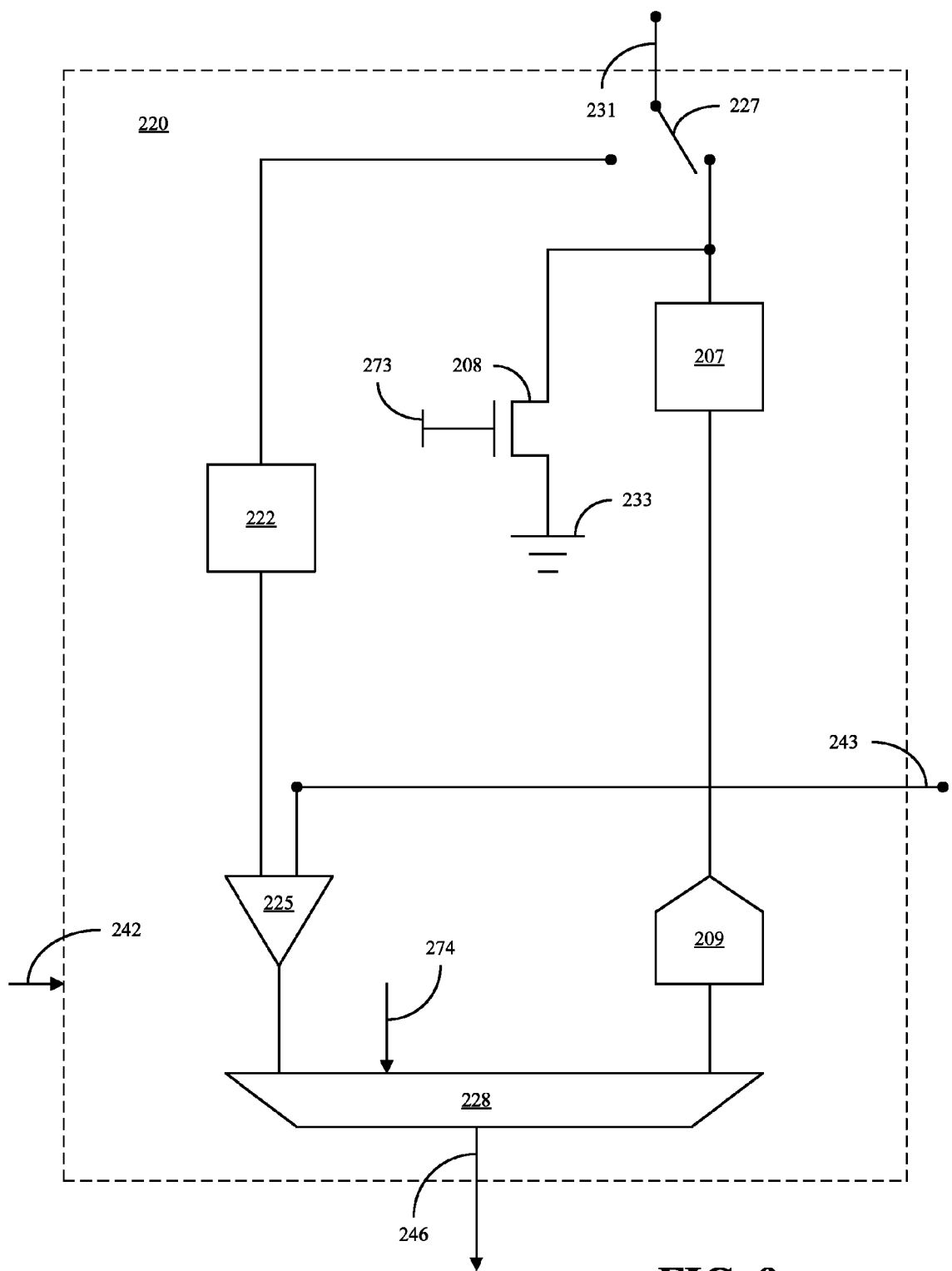
FIG. 9 illustrates a column ADC circuit in accordance with an embodiment of the present invention.

FIG. 9 illustrates the column ADC circuit 220 in accordance with an embodiment of the present invention. The column ADC circuit 220 includes an output mode switch 227, a double sampling amplifier 207, a source transistor 208, an ADC circuit 209, a current-to-voltage converter 222, a difference comparator 225, and a digital multiplexer 228. An example one of the column readout lines $231_1, 231_2, \ldots, 231_m$ (refer to FIG. 6) is shown in FIG. 9 as the column readout line 231. An example one of the digital output lines $246_1, 246_2, \ldots, 246_m$ (refer to FIG. 6) is shown in FIG. 9 as a digital output line 246. The one or more control lines 242 from the control processor 212 (refer to FIG. 6) are input to the column ADC circuit 220. In various embodiments, the control processor 212 (refer to FIG. 6) is configured to supply control signals on the one or more control lines 242 to control operations of the output mode switch 227, the double sampling amplifier 207, the source transistor 208, the current-to-voltage converter 222, the ADC circuit 209, the difference comparator 225, and the digital multiplexer 228. In various embodiments, the one or more control lines 242 include a selection signal line 274 for providing a selection signal from the control processor 212 (refer to FIG. 6) to the digital multiplexer 228.

As illustrated in an embodiment of the column ADC circuit 220 in FIG. 9, the output mode switch 227 is controllable to connect the column readout line 231 to either an input of the current-to-voltage converter 222, or to both an input of the double sampling amplifier 207 and a first terminal of the source transistor 208. In various embodiments, the output mode switch 227 is controllable by the control processor 212 (refer to FIG. 6) by control signals provided over the one or more control lines 242. In various embodiments, the current-to-voltage converter 222 is configured to receive an analog current signal, convert the analog current signal to a voltage signal, and to output the voltage signal. An output of the current-to-voltage converter 222 is connected to a first input of the difference comparator 225. A second input of the difference comparator 225 is connected to the reference voltage line 243 to receive a reference voltage signal from the reference signal converter 221 (refer to FIG. 6). In various embodiments, the difference comparator 225 is configured to amplify a difference between the voltage signal output from the current-to-voltage converter 222 and the reference voltage signal received on the reference voltage line 243, and to generate a digital output based on the difference. In various embodiments, the output of the difference comparator 225 is provided to a first input of the digital multiplexer 228.

In various embodiments, the first terminal of the source transistor 208 is connected to the input of the double sampling amplifier 207. Also, in various embodiments, a second terminal of the source transistor 208 is connected to ground 233, and a gate of the source transistor 208 is connected to a voltage providing source 273. In various embodiments, the double sampling amplifier 207 is configured to sample a pixel output voltage on the column readout line 231 and to also sample a reset voltage on the column readout line 231 at a different time, and to compute a difference of the pixel output voltage and the reset voltage to obtain a corrected pixel output voltage. In various embodiments, the ADC circuit 209 is connected to an output of the double sampling amplifier 207 to receive the corrected pixel output voltage from the double sampling amplifier 207. In various embodiments, the ADC circuit 209 is configured to digitize the corrected pixel output voltage and to supply the digitized corrected pixel output voltage to a second input of the digital multiplexer 228. In various embodiments, the digital multiplexer 228 is configured to provide either the output of the difference comparator 225 or the output of the ADC circuit 209 on the digital output line 246 based on a control signal provided on the selection signal line 274.

Figure 10:
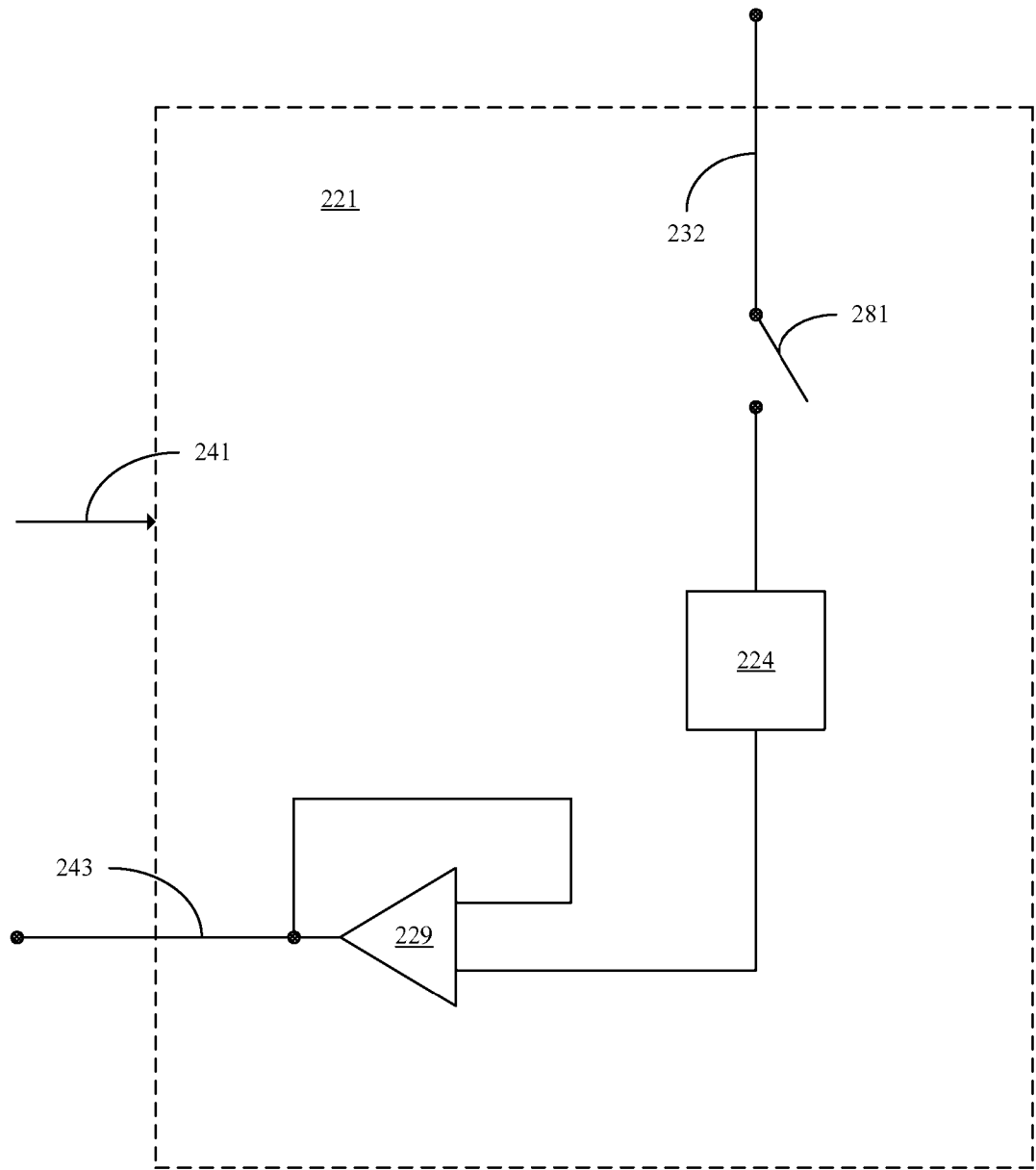
FIG. 10 illustrates a reference signal converter in accordance with an embodiment of the present invention.

FIG. 10 illustrates the reference signal converter 221 in accordance with an embodiment of the present invention. In various embodiments, the reference signal converter 221 includes a switch 281, a current-to-voltage converter 224, and a voltage driver 229. In various embodiments, the switch 281 is controllable to connect or disconnect the reference signal line 232 to an input of the current-to-voltage converter 224. In various embodiments, the switch 281 is controlled by a control signal provided on the one or more control lines 241 from the control processor 212 (refer to FIG. 6). In various embodiments, the current-to-voltage converter 224 is configured to convert a reference analog current signal provided on the reference signal line 232 into a corresponding voltage signal, and to output the corresponding voltage signal. In various embodiments, the voltage signal output from the current-to-voltage converter 224 is provided to a first input of the voltage driver 229. In various embodiments, an output of the voltage driver 229 is provided as feedback to a second input of the voltage driver 229, and the voltage driver 229 is configured to drive a reference voltage signal on the reference voltage line 243, where the reference voltage signal is based at least partially on the output of the current-to-voltage converter 224.

Figure 11:
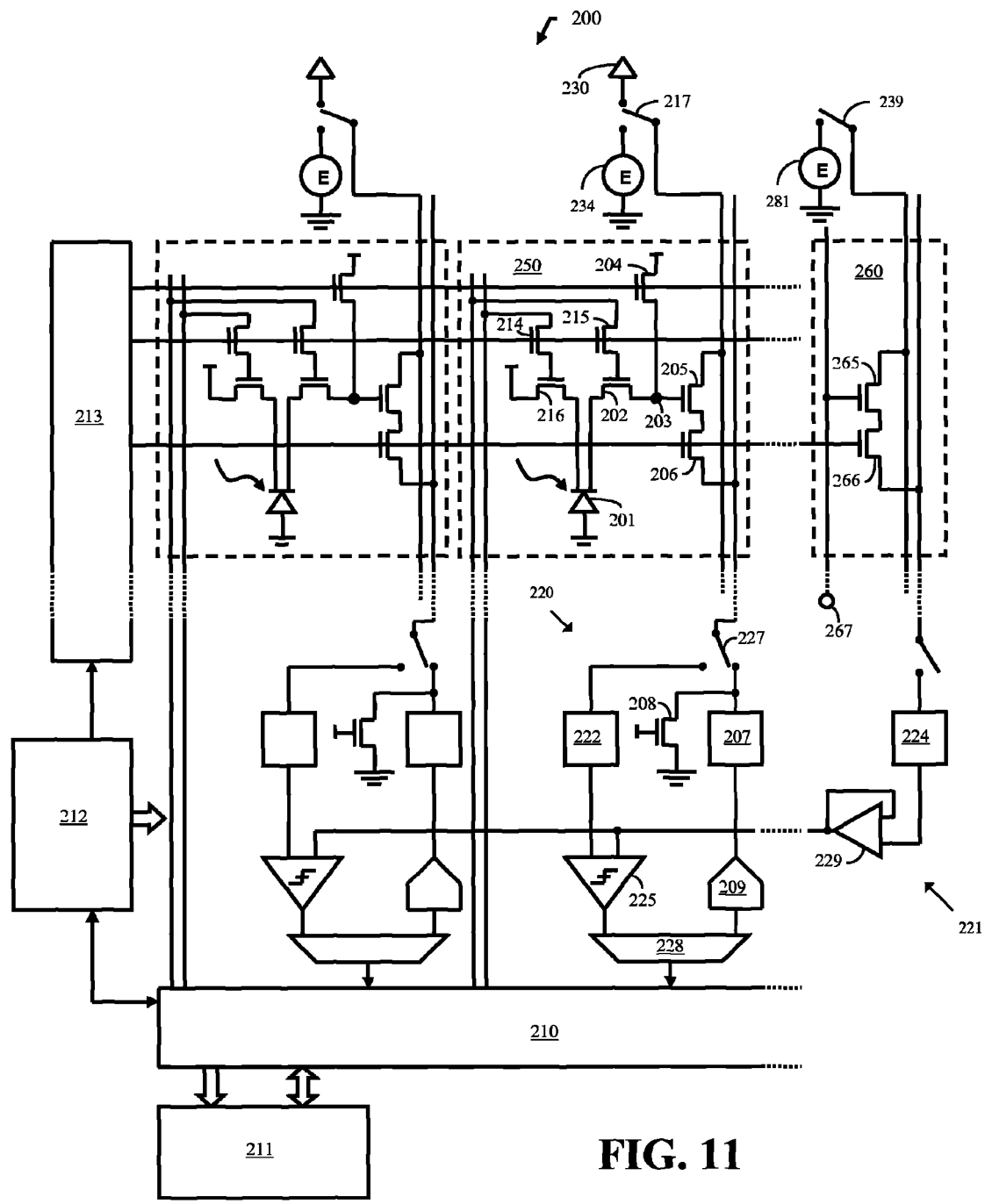
FIG. 11 illustrates an image sensor circuit in accordance with an embodiment of the present invention.

FIG. 11 illustrates the image sensor circuit 200 of FIG. 6, in which the pixel circuit 250 of FIG. 7, the threshold current generator 260 of FIG. 8, the column ADC circuit 220 of FIG. 9, and the reference signal converter 221 of FIG. 10 are depicted, in accordance with an embodiment of the present invention. An example one of the voltage source switches $217_1, 217_2, \ldots, 217_m$ (refer to FIG. 6) is shown in FIG. 11 as a voltage source switch 217. An example one of the bias voltage sources $234_1, 234_2, \ldots, 234_m$ (refer to FIG. 6) is shown in FIG. 11 as a bias voltage source 234. In various embodiments, the image sensor circuit 200 is controllable to operate in either a voltage-analog mode or a current-analog mode. In various embodiments, the control processor 212 is configured to set either the voltage-analog mode or the current-analog mode for output from the pixel circuit 250 by controlling the voltage source switch 217, the output mode switch 227, and the digital multiplexer 228.

To set the voltage-analog mode, in various embodiments, the control processor 212 controls (i) the voltage source switch 217 such that the first terminal of the drive transistor 205 is connected through the switch 217 to the voltage source 230; (ii) the output mode switch 227 such that the second terminal of the read select transistor 206 is connected to the first terminal of the source transistor 208 and the input of the double sampling amplifier 207; and (iii) the digital multiplexer 228 such that the digital multiplexer 228 provides as output the output of the ADC circuit 209. In such embodiments in the voltage-analog mode, the pixel circuit 250 is able to provide voltage signals to the column ADC circuit 220, which are sampled by the double sampling amplifier 207.

To set the current-analog mode, in various embodiments, the control processor 212 controls (i) the voltage source switch 217 such that the first terminal of the drive transistor 205 is connected through the switch 217 to the bias voltage source 234; (ii) the output mode switch 227 such that the second terminal of the read select transistor 206 is connected to the input of the current-to-voltage converter 222; (iii) the switch 239 such that the first terminal of the current control transistor 265 is connected through the switch 239 to the bias voltage source 281; and (iv) the digital multiplexer 228 such that the digital multiplexer 228 provides as output the output of the difference comparator 225. In such embodiments in the current-analog mode, the pixel circuit 250 is able to provide one or more current signals to the column ADC circuit 220, which are converted to a corresponding one or more voltage signals by the current-to-voltage converter 222.

An operation of the image sensor circuit 200 in accordance with an embodiment of the present invention is now described with reference to FIGS. 6, 7, 8, 9, 10, and 11. Prior to an image capture operation, the photodiode 201 and the sense node 203 are reset by having the pixel control signal generator 213 provide a HIGH signal on the reset signal line 252 and a HIGH signal on the transfer signal line 253, and by having the digital image processor 210 provide a HIGH signal on the exposure control signal line 255 and a LOW signal on the anti-blooming control signal line 256. Such a combination of signals causes both the reset transistor 204 and the transfer gate transistor 202 to be turned on, and causes the anti-blooming gate transistor 216 to be turned off.

In various embodiments, each of the anti-blooming gate transistor 216 and the transfer gate transistor 202 have respective parasitic capacitances such that values written to the respective gates of the anti-blooming gate transistor 216 and the transfer gate transistor 202 can persist, for example, until they are written with new values. Moreover, the gates of the anti-blooming gate transistor 216 and the transfer gate transistor 202 can be isolated by the first write select transistor 214 and the second write select transistor 215, respectively. Thus, once values have been provided to the respective second terminals of the first write select transistor 214 and the second write select transistor 215 for the reset operation and the HIGH signal has been provided on the transfer signal line 253, the signal on the transfer signal line 253 may be changed to LOW, and the anti-blooming gate transistor 216 and the transfer gate transistor 202 will maintain the provided values due to parasitic capacitance, for example, until new values are written.

In various embodiments, when an image capture operation is initiated, a LOW signal is provided on the reset signal line 252 to turn off the reset transistor 204, while the transfer gate transistor 202 remains on to allow charge generated in the photodiode 201 to accumulate in the sense node 203. During such a state, there is an integration of charge from the photodiode 201 in the sense node 203. Once charge has started accumulating in the sense node 203, an analog current readout may be performed by setting the voltage source switch 217, the output mode switch 227, the switch 239, and the digital multiplexer 228 according to the current-analog mode settings, and then having the pixel control signal generator 213 provide a HIGH signal on the row readout signal line 254 to turn on the read select transistor 206. After the analog current readout has been performed, the control signal generator 213 may provide a LOW signal on the row readout signal line 254.

When the HIGH signal is provided on the row readout signal line 254 to turn on the read select transistor 206 for the readout in the current-analog mode, a current is generated in the column readout line 231 that is proportional to a voltage level of the sense node 203. The current-to-voltage converter 222 transforms the current on the column readout line 231 to a pixel output voltage. A reference current is generated in the threshold current generator 260 according to a threshold voltage provided by the threshold voltage source 267. The current-to-voltage converter 224 transforms the reference current to a reference voltage that is driven on the reference voltage line 243 by the voltage driver 229. The difference comparator 225 amplifies a difference between the pixel output voltage and the reference voltage to provide a digital output. The digital image processor 210 reads the digital output of the difference comparator 225 through the multiplexer 228.

The readout of the current on the column readout line 231 from the pixel circuit 250 is non-destructive, such that the charge accumulated at the sense node 203 remains at the sense node 203 after the readout of the current on the column readout line 231. Thus, in various embodiments, the readout of the current from the pixel circuit 250 may be performed a plurality of times during the image capture operation without destroying charge that is accumulating in the sense node 203 during the image capture operation. One or more additional analog current readouts may be performed during the image capture operation by setting the voltage source switch 217, the output mode switch 227, the switch 239, and the digital multiplexer 228 according to the current-analog mode settings, and then having the pixel control signal generator 213 provide a HIGH signal on the row readout signal line 254 to turn on the read select transistor 206. After the analog current readout has been performed, the control signal generator 213 may provide a LOW signal on the row readout signal line 254. Thus, charge accumulating in the sense node 203 may be monitored during the image capture operation by performing a plurality of analog current readouts at different times during the image capture operation, where each analog current readout is non-destructive with respect to charge accumulating in the sense node 203.

In various embodiments, an integration of charge at the sense node 203 may be stopped during the image capture operation, while maintaining the charge that has already been accumulated in the sense node 203. In order to stop the integration of charge at the sense node 203, the digital image processor 210 may provide a LOW signal on the exposure control signal line 255 and a HIGH signal on the anti-blooming control signal line 256, and the pixel control signal generator 213 may provide a HIGH signal on the transfer signal line 253. Such a combination of signal causes the transfer gate transistor 202 to be turned off and the anti-blooming gate transistor 216 to be turned on. Since the anti-blooming gate transistor 216 and the transfer gate transistor 202 have certain parasitic gate capacitances that allow those transistors to store values, the pixel control signal generator 213 may then provide a LOW signal on the transfer signal line 253, and the anti-blooming gate transistor 216 and the transfer gate transistor 202 will maintain their values until written with new values. The photodiode 201 is depleted when the anti-blooming gate transistor 216 is turned on.

An analog voltage readout may be performed by setting the voltage source switch 217, the output mode switch 227, and the digital multiplexer 228 according to the voltage-analog mode settings, and then having the pixel control signal generator 213 provide a HIGH signal on the row readout signal line 254 to turn on the read select transistor 206. When the HIGH signal is provided on the row readout signal line 254 to turn on the read select transistor 206 for the readout in the voltage-analog mode, a pixel output voltage is provided on the column readout line 231 at the first terminal of the source transistor 208 that is proportional to a voltage level of the sense node 203. The double sampling amplifier 207 samples the pixel output voltage at the first terminal of the source transistor 208 during the voltage readout from the pixel circuit 250. After the analog voltage readout has been performed, the control signal generator 213 may provide a LOW signal on the row readout signal line 254. The double sampling amplifier 207 also samples a reset voltage at the first terminal of the source transistor 208 when the sense node 203 is in a reset state. The double sampling amplifier 207 computes a difference between the pixel output voltage and the reset voltage to arrive at a corrected pixel output voltage, which is digitized by the ADC circuit 209. For the analog voltage readout, the digital image processor 210 reads the digital output of the ADC circuit 209 through the multiplexer 228.

The pixel circuit 250 may be reset to place the sense node 203 in a reset state by having the digital image processor 210 provide a HIGH signal on the exposure control signal line 255 and a LOW signal on the anti-blooming control signal line 256, and by having the pixel control signal generator 213 provide a HIGH signal on the transfer signal line 253 and a HIGH signal on the reset signal line 252. Such a combination of signals causes both the reset transistor 204 and the transfer gate transistor 202 to be turned on, and causes the anti-blooming gate transistor 216 to be turned off. When the sense node 203 is in the reset state and a HIGH signal is provided on the row readout signal line 254 by the pixel control signal generator 213 to turn on the read select transistor 206, a reset voltage is provided at the first terminal of the source transistor 208 that is proportional to a reset voltage level of the sense node 203. The double sampling amplifier 207 may sample the reset voltage at the first terminal of the source transistor 208 to be used for a voltage analog readout from the pixel circuit 250.

One advantage of allowing for both analog current readout and analog voltage readout from the pixel circuit 250 is that each type of readout has desirable qualities. The analog current readout may provide for high speed readout from the pixel array 240, because high capacitance of the column readout line 231, which may exist for large pixel arrays, will not prevent the analog current output from developing quickly. The analog voltage readout may provide for low noise signal readouts from the pixel array 240. Thus, in various embodiments, the analog current readout may be used to obtain values quickly a plurality of times from the pixel array during an image capture operation, while the analog voltage readout may be used to obtain final values with low noise at an end of an image capture operation.

Another advantage of analog current readout is that it allows multiple rows of pixel circuits 250 in the pixel array 240 to be selected simultaneously to produce an output current for each column of the pixel array 240 that is proportional to a summation of the output currents of the pixel circuits 250 of the selected rows of the pixel array 240. Such multiple row readout allows for spatially averaging or smoothing an output image in a vertical direction. In certain image acquisition methods, such local image averaging may be beneficial for filtering certain kinds of noise, such as noise that is commonly produced by pixel circuit defects and fixed pattern noise produced by differences between drive transistors of different pixel circuits, since the local image averaging provides low pass filtering in a vertical direction of the image and anti-alias filtering when sub-sampling an image by rows.

Figure 12:
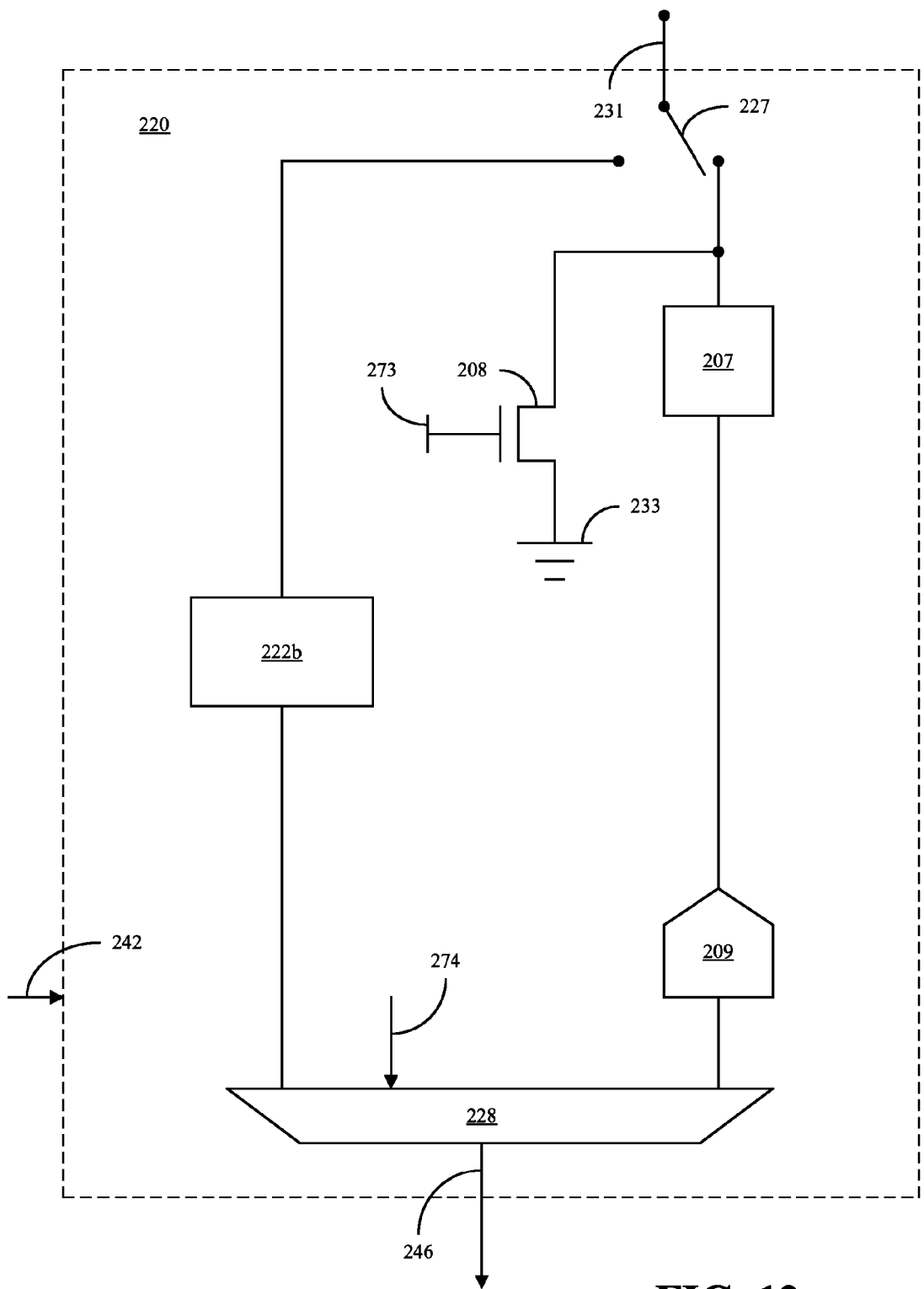
FIG. 12 illustrates a column ADC circuit in accordance with an embodiment of the present invention.

FIG. 12 illustrates another embodiment of the column ADC circuit 220 in accordance with an embodiment of the present invention. Elements of the embodiment of the column ADC circuit 220 of FIG. 12 that are the same as elements of the embodiment of the column ADC circuit 220 of FIG. 9 are labeled with the same reference numbers. The embodiment of the column ADC circuit 220 of FIG. 12 differs from the embodiment of the column ADC circuit 220 of FIG. 9 in that the current-to-voltage converter 222 and the difference comparator 225 are replaced by a current comparator 222b. The current comparator 222b is configured to detect whether a current input to the current comparator 222b is positive or negative, and to provide a binary output indicative of a result of the detection. The input of the current comparator 222b is connected to the column readout line 231 in a case where the switch 227 is controlled to connect the column readout line 231 to the input of the current comparator 222b. The output of the current comparator 222b is provided to the first input of the multiplexer 228.

Figure 13:
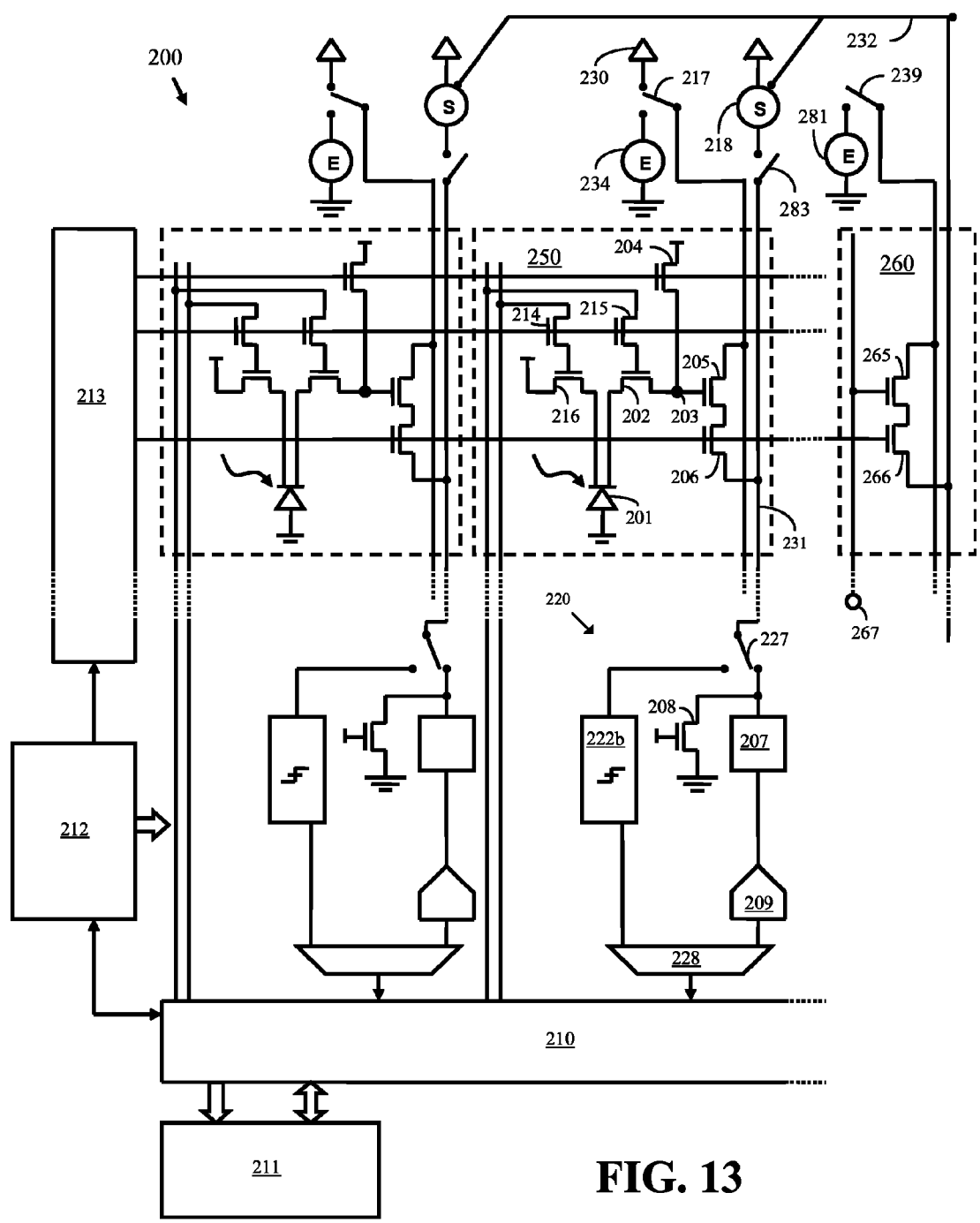
FIG. 13 illustrates an image sensor circuit in accordance with an embodiment of the present invention.

FIG. 13 illustrates another embodiment of the image sensor circuit 200 in accordance with an embodiment of the present invention. The embodiment of the image sensor circuit 200 of FIG. 13 differs from the embodiment of the image sensor circuit 200 of FIG. 11 in that the embodiment of the image sensor circuit 200 of FIG. 13 includes the embodiment of the column ADC circuit 220 of FIG. 12 rather than the embodiment of the column ADC circuit 220 of FIG. 9. Also, the embodiment of the image sensor circuit 200 of FIG. 13 does not include the reference signal converter 221 (refer to FIG. 6). In addition, the embodiment of the image sensor circuit 200 of FIG. 13 further includes a current source for each column of pixel circuits, an example one of which is shown as the current source 218, and also further includes a current source switch for each column of pixel circuits, an example one of which is shown as the current source switch 283. Other elements of the embodiment of the image sensor circuit 200 of FIG. 13 that are the same as elements of the embodiment of the image sensor circuit 200 of FIG. 11 are labeled with the same reference numbers.

In the embodiment of the image sensor circuit 200 of FIG. 13, each current source for each column of pixel circuits, such as the current source 218, is connected to the reference signal line 232. The current source 218 provides a bias current that is set by mirroring a current produced by the threshold current generator 260 when the threshold current generator 260 is excited with a bias voltage from the threshold voltage source 267. In various embodiments, the current source switch 283 is controllable by the control processor 212 to be in either a disconnect state, or to connect the current source 218 to the column readout line 231. In a voltage-analog mode for the embodiment of the image sensor circuit 200 of FIG. 13, the control processor 212 controls the current source switch 283 to be in the disconnect state.

In a current-analog mode for the embodiment of the image sensor circuit 200 of FIG. 13, the control processor 212 controls the current source switch 283 to connect the current source 218 to the column readout line 231. In such a state, when a current is generated by the pixel circuit 250, a total current arriving at the input of the current comparator 222$b$ equals the current generated by the pixel circuit 250 minus the bias current produced by the current source 218. The current comparator 222$b$ determines whether the arriving current is positive or negative and provides binary information based on the determination as output to the digital multiplexer 228 for the current-analog mode in such embodiments. In various embodiments, the one or more circuits 290 (refer to FIG. 5) further comprise the current source, such as the current source 218, and the current source switch, such as the current source switch 283, for each column of pixel circuits of the pixel array 240 (refer to FIG. 6).

Figure 14:
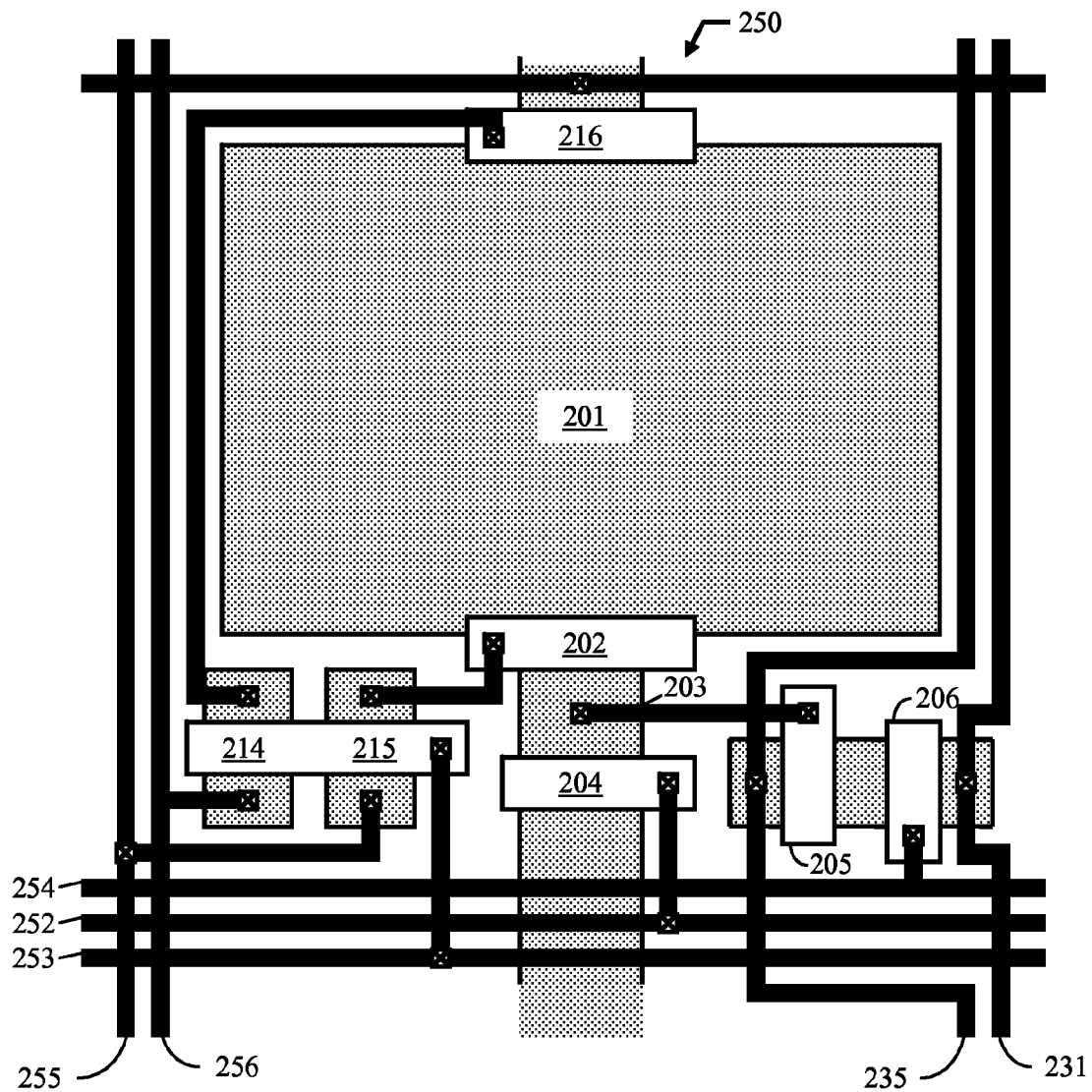
FIG. 14 illustrates a layout of a pixel circuit in accordance with an embodiment of the present invention.

FIG. 14 illustrates an example layout of the pixel circuit 250 of FIG. 7 in accordance with an embodiment of the present invention. Elements in the example layout of the pixel circuit 250 in FIG. 14 that are the same as elements in the pixel circuit 250 of FIG. 7 are labeled with the same reference numbers. In various embodiments, the transfer gate transistor 202 and the anti-blooming gate transistor 216 may be located on opposite sides of the photodiode 201 from each other. In some embodiments, the transfer gate transistor 202, the sense node 203, the reset transistor 204, the drive transistor 205, the read select transistor 206, the first write select transistor 214, and the second write select transistor 215 are each located to a same side of the photodiode 201.

Figure 15:
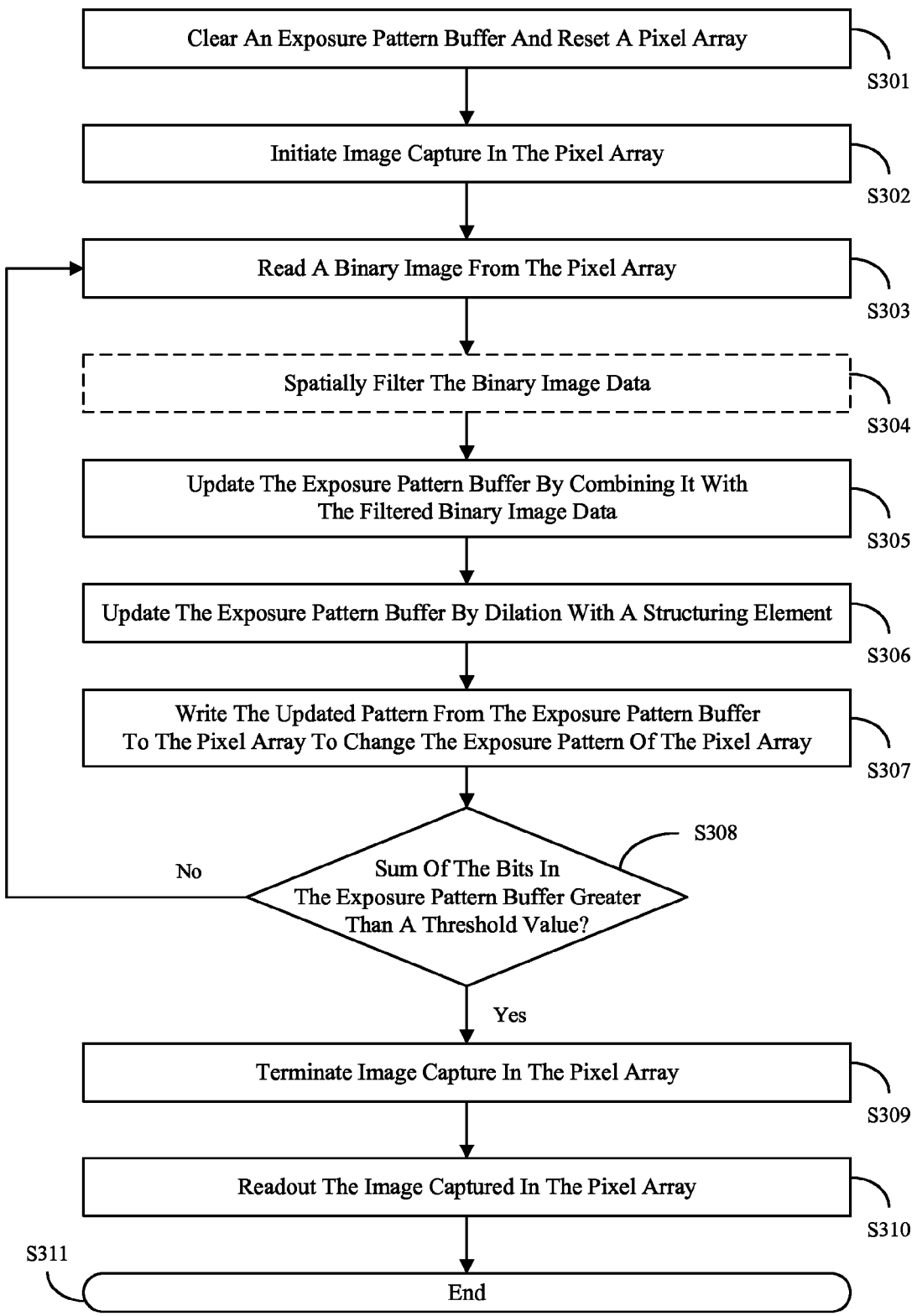
FIG. 15 illustrates a flowchart of a method in an image sensor circuit in accordance with an embodiment of the present invention.

FIG. 15 illustrates a flowchart of a method in accordance with an embodiment of the present invention. The method of FIG. 15 will be explained while referring to the image sensor circuit 200 of FIG. 6 and the pixel circuit 250 of FIG. 7. Also, an example operation of the method in accordance with an embodiment of the invention is provided in FIGS. 19A-19K. The example provided in FIGS. 19A-19K is for an embodiment of the pixel array 240 in which the pixel array 240 has seven rows and eight columns of pixel circuits. It should be understood that such an embodiment of the pixel array 240 is merely provided as an example, and that in various other embodiments, the pixel array 240 may have more or less rows and more or less columns of pixel circuits. For example, some embodiments of the pixel array 240 may include more than seven rows and more than eight columns of pixel circuits.

Some steps in FIG. 15 refer to an exposure pattern buffer. In various embodiments, a portion of the image memory buffer 211 is used as the exposure pattern buffer. In various other embodiments, the image sensor circuit 200 may include the exposure pattern buffer 295 as a memory that is separate from the image memory buffer 211. In the example of FIGS. 19A-19K, some of the figures for the example illustrate example contents of an embodiment of the exposure pattern buffer 295. It should be understood that the size of the embodiment of the exposure pattern buffer 295 in the example is merely provided as an example, and that in various other embodiments, the exposure pattern buffer 295 may have a greater capacity or a smaller capacity than illustrated in the example.

In the method of FIG. 15, in S301, the exposure pattern buffer 295 is cleared by the digital image processor 210, and the pixel array 240 is reset by the pixel control signal generator 213 and the digital image processor 210. In various embodiments, the exposure pattern buffer 295 stores exposure information such as, for example, exposure pattern data that includes one or more bits for each pixel circuit 250 in the pixel array 240. Also, in various embodiments, the exposure pattern buffer 295 is cleared by setting each of the stored bits in the exposure pattern buffer 295 to an initial state. FIG. 19A illustrates example contents of the exposure pattern buffer 295 in accordance with an embodiment of the present invention after the exposure pattern buffer 295 has been cleared. In the example of FIG. 19A, the exposure pattern buffer 295 includes one bit for each pixel circuit in an embodiment of the pixel array 240 (refer to FIG. 19B), and the exposure pattern buffer 295 in the example is cleared by setting all bits to a "0" value, such that the memory is zeroed.

In various embodiments of the image sensor circuit 200, the pixel array 240 is reset by having the pixel control signal generator 213 provide a HIGH signal on both the reset signal line 252 and the transfer signal line 253 of each of the row control lines $223_1, 223_2, \ldots, 223_n$, and by having the digital image processor 210 provide a HIGH signal on the exposure control signal line 255 and a LOW signal on the anti-blooming control signal line 256 of each of the pixel control signal lines $226_1, 226_2, \ldots, 226_m$. With such a combination of signals, the reset transistor 204 and the transfer gate transistor 202 of each of the pixel circuits 250 are turned on, while the anti-blooming gate transistor 216 of each of the pixel circuits 250 is turned off. Once the anti-blooming gate transistor 216 and the transfer gate transistor 202 have received the provided signals at their respective gates, parasitic capacitances at their respective gates are charged or discharged depending on the values written, such that when the first write select transistor 214 and the second write select transistor 215 of each of the pixel circuits are turned off with a LOW signal on the corresponding transfer signal line 253, the states of the anti-blooming gate transistor 216 and the transfer gate transistor 202 can persist. In effect, this represents two bits of write only digital memory that maintain the state of the anti-blooming gate transistor 216 and the transfer gate transistor 202. The method then continues to S302.

In S302, an image capture operation is initiated such that image capture is initiated in the pixel array 240. In various embodiments, image capture is initiated in the pixel array 240 by having the pixel control signal generator 213 provide a LOW signal on the reset signal line 252 of each of the row control lines $223_1, 223_2, \ldots, 223_n$, so as to turn off the reset transistor 204 of each of the pixel circuits 250. In various embodiments, the photodiode 201 of each of the pixel circuits 250 is pinned at a voltage that results in the spontaneous migration of photo-generated charge from the photodiode 201 of the pixel circuit 250 to the sense node 203 whenever the transfer gate 202 of the pixel circuit 250 is on. In various embodiments of the pixel circuit 250, when the reset transistor 204 is on the reset transistor 204 serves to hold the sense node 203 at a reset voltage level, thereby substantially preventing an accumulation of charge in the sense node 203, but when the reset transistor 204 is turned off and the transfer gate transistor 202 is on charge will accumulate in the sense node 203 at a rate that is proportional to light energy impinging on the photodiode 201.

FIG. 19B illustrates an example of an exposure pattern of an embodiment of the pixel array 240 in which image capture has been initiated. For purposes of illustration, pixel circuits of the pixel array 240 in the example of FIG. 19B that are enabled to accumulate charge in their sense nodes are shown as white boxes. In FIG. 19B, since image capture has just been initiated, all of the pixel circuits in the pixel array 240 are shown as white boxes, because all of the pixel circuits in the pixel array 240 of the embodiment of FIG. 19B are enabled to accumulate charge in their sense nodes at the beginning of an image capture operation. Once image capture has been initiated in the pixel array 240, the method continues to S303.

In S303, a binary image is read from the pixel array 240. In various embodiments, the readout from the pixel array 240 in S303 is performed in the current-analog mode, such that signals output from the pixel array 240 on the column readout lines $231_1, 231_2, \ldots, 231_m$ are current signals. In a case where the embodiment of the image sensor circuit 200 of FIG. 11 is used, the voltage source switch 217, the output mode switch 227, and the digital multiplexer 228 for each column of pixel circuits 250, as well as the switch 239 are set in accordance with the current-analog mode as discussed above. In a case where the embodiment of the image sensor circuit 200 of FIG. 13 is used, the current source switch 283 for each column of pixel circuits 250 is further set in accordance with the current-analog mode as discussed above.

In various embodiments, in the current-analog mode, each of the pixel circuits 250 are sampled and their current-analog output level, which is representative of a number of photons absorbed by their photodiode 201 since an end of the reset, is compared with a reference level to produce a binary representation of an image presently captured and stored in the pixel circuits 250 of the pixel array 240. In various embodiments, the reset transistor 204 of each pixel circuit 250 remains off during the pixel circuit readout process in S303, thereby rendering the pixel circuit readout process nondestructive with respect to charge accumulating in the sense node 203 of each pixel circuit 250.

In various embodiments, the readout process in S303 proceeds on a row-by-row basis. For example, in various embodiments, one row of pixel circuits 250 in the pixel array 240 is read-out, and then the another row of pixel circuits 250 in the pixel array 240 is read-out, and so on until all rows have been read-out. Each row may be read-out, for example, by having the pixel control signal generator provide a HIGH signal on the row readout signal line 254 of the row control line 223 for the row when the row is to be read-out, and then providing a LOW signal on the readout signal line 254 of the row control line 223 for the row after the row has been read-out. In some embodiments, it is possible to sub-sample rows and/or to select more than one row of the pixel array 240 at a time for read-out. In cases where more than one row is selected for read-out at a same time in the current-analog mode, the column readout line 231 for any given column of the pixel array 240 provides a sum of the outputs of the pixel circuits 250 selected to provide output for the column. Such a technique could be used, for example, to implement a vertical image smoothing operation, entirely in a current-analog domain of the image sensor circuit 200, and filtering of that kind has benefits generally related to spatial noise reduction, with some specific uses including anti-aliasing and mitigating an influence of pixel circuit manufacturing defects. Once the binary image has been read from the pixel array 240, the method continues to S304.

In S304, the binary image data obtained in S303 is processed. For example, the binary image data may be spatially filtered to eliminate noise. Some methods of filtering the binary image data include median filtering or morphological closing to eliminate features too small to be considered significant for the purposes of the method of FIG. 15. In cases where vertically oriented smoothing has already been applied as part of the current-analog readout process of S303, the processing in S304 in various embodiments may be simplified by limiting the processing of the binary image data to processing in a horizontal direction. In some embodiments of the method of FIG. 15, the step S304 is optional and may be bypassed altogether. In some embodiments, subsequent to the noise filtering described above for S304, the step S304 may also include some dilation of the image by a structuring element, thereby accelerating the propagation of an exposure control signal pattern in a vicinity of initial points provided by the binary image data. In various embodiments, the processing in S304 is performed by the digital image processor 210. The process then continues to S305.

In S305, in a case where the step S304 has been performed, the filtered binary image data from S304 is combined with the exposure pattern data stored in the exposure pattern buffer 295. In a case where the step S304 has been bypassed, the binary image data from S303 is combined with the exposure pattern data stored in the exposure pattern buffer 295. In various embodiments, the digital image processor 210 combines the filtered binary image data with the exposure pattern data stored in the exposure pattern buffer 295 by, for example, performing a logical "OR" of the filtered binary image data with the exposure pattern data, and then storing the result back to the exposure pattern buffer 295.

FIG. 19C illustrates an example of contents of the exposure pattern buffer 295 after the contents of the exposure pattern buffer 295 of FIG. 19A have been updated by being combined with example filtered binary image data. In the example, the filtered binary image data was the same as the exposure pattern data in the exposure pattern buffer 295 of FIG. 19A, except that there was a "1" bit corresponding to an output of a pixel circuit in row 5 and column 3 of the pixel array 240, so that after the exposure pattern data of FIG. 19A has been logically OR-ed with the filtered binary image data, there is a "1" bit in the resulting exposure pattern buffer 295 in FIG. 19C for row 5 and column 3. The "1" bit in the example of FIG. 19C corresponding to the pixel circuit in row 5 and column 3 of the pixel array 240 may represent, for example, that an output current signal from that pixel circuit exceeded a threshold value when the current signal was read-out in S303. In such an example, the pixel circuit in row 5 and column 3 may be sampling light from a brightest part of a scene being imaged, such that charge accumulated in a sense node of that pixel circuit may already exceed a certain value while charge accumulating in the other pixel circuits may not have reached the certain value.

In various embodiments, once the exposure pattern buffer 295 has been updated in S305, the method continues to S306. In S306, the contents of the exposure pattern buffer 295 are updated to provide for dilation according to a dilation rule. In various embodiments, the dilation rule is specified by one or more structuring elements. A structuring element may specify, for example, how to dilate the contents of the exposure pattern buffer 295. In some embodiments, a structuring element may specify how to expand a logic value "1" in the exposure pattern buffer 295 by a certain number of units in one or more directions within the exposure pattern buffer 295. Various examples of dilation rules specified by structuring elements in accordance with embodiments of the present invention are illustrated in FIGS. 18A-18D. It should be understood that the example structuring elements provided in FIGS. 18A-18D are merely examples, and that any desired structuring element may be used in the method of FIG. 15.

Figure 18A:
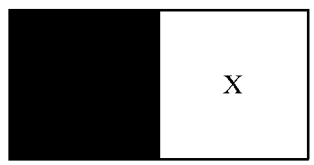
FIG. 18A illustrates a dilation rule specified by a structuring element in accordance with an embodiment of the present invention.

FIG. 18A illustrates an example of a dilation rule specified by a structuring element in accordance with an embodiment of the present invention. In FIG. 18A, the black box represents an entry in an exposure pattern buffer with a logic value of "1". The entry with the logic value of "1" is related to a particular pixel circuit in a pixel array. The box with the "x" indicates that an entry in the exposure pattern buffer that relates to a pixel circuit in the pixel array that is immediately to the right of the particular pixel circuit is to be also set to the logic value of "1". Thus, each logic value of "1" in the exposure pattern buffer would be expanded by one entry to the right if the dilation rule specified by the structuring element of FIG. 18A is used for dilation.

Figure 18B:
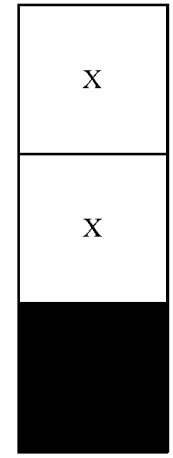
FIG. 18B illustrates a dilation rule specified by a structuring element in accordance with an embodiment of the present invention.
Figure 18C:
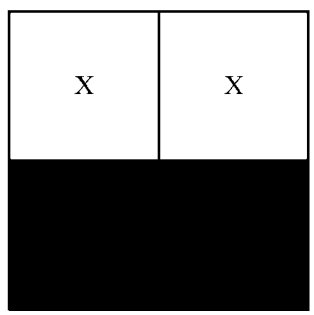
FIG. 18C illustrates a dilation rule specified by a structuring element in accordance with an embodiment of the present invention.
Figure 18D:
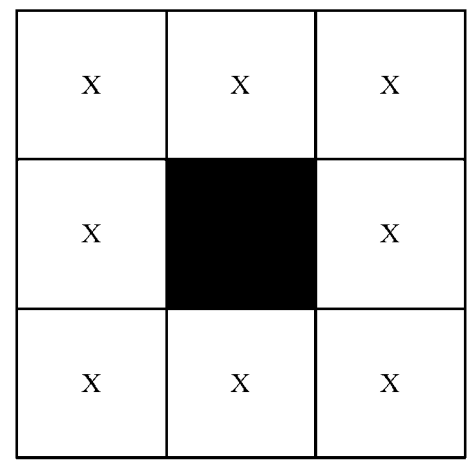
FIG. 18D illustrates a dilation rule specified by a structuring element in accordance with an embodiment of the present invention.

FIG. 18B illustrates an example of a dilation rule specified by a structuring element in which a logic value of "1" in an exposure pattern buffer is expanded by two entries above the entry with the logic value of "1", such that the two entries above the entry are set to the logic value of "1". FIG. 18C illustrates an example of a dilation rule specified by a structuring element in which two adjacent entries with a logic value of "1" in an exposure pattern buffer that are related to two adjacent pixel circuits in a pixel array are each expanded to one entry above the entry. In such an example, a single entry with a logic value of "1" that does not have an adjacent entry with a logic value of "1" would not be expanded to other entries. FIG. 18D illustrates an example of a dilation rule specified by a structuring element in which a logic value of "1" in an entry of an exposure pattern buffer is to be expanded by one entry in all directions within the exposure pattern buffer.

FIG. 19D illustrates an example of contents of the exposure pattern buffer 295 after the contents of the exposure pattern buffer 295 of FIG. 19C have been dilated in accordance with the example dilation rule specified by the structuring element of FIG. 18D. In the example of FIG. 19D, the logic value of "1" in row 5 and column 3 of the exposure pattern buffer 295 is expanded in all directions according to the dilation rule of FIG. 18D, such that all of the entries surrounding the entry for row 5 and column 3 are set with a logic value of "1". Thus, in various embodiments, step S306 allows for exposure pattern data in the exposure pattern buffer 295 to be morphologically dilated, thereby causing features to grow by some number of pixel units in one or more directions within the exposure pattern buffer 295. A speed at which the exposure pattern data propagates relative to a readout rate of a pixel array may be controlled by modifying a size and shape of one or more structuring elements that define a pattern of dilation. Once the contents of the exposure pattern buffer 295 have been updated through dilation with one or more structuring elements, the method of FIG. 15 continues to S307.

Referring to FIGS. 6, 7, and 15, in step S307, the updated exposure pattern data from the exposure pattern buffer 295 is written to the pixel array 240 to change the exposure pattern of the pixel array 240. In various embodiments, the exposure pattern of the pixel array 240 is defined by which pixel circuits 250 in the pixel array 240 are enabled to accumulate additional charge in their respective sense nodes and which pixel circuits 250 in the pixel array 240 are being prevented or stopped from accumulating additional charge in their respective sense nodes. In various embodiments, the exposure pattern of the pixel array 240 is resynchronized with the contents of the exposure pattern buffer 295 by writing the exposure pattern data from the exposure pattern buffer 295 to the pixel array 240. In the exposure pattern buffer 295 for various embodiments, a logic value of "0" for an entry indicates that the corresponding pixel circuit 250 in the pixel array 240 is to be allowed to continue integrating or accumulating charge in its respective sense node 203 during the image capture operation, while a logic value of "1" for an entry indicates that the corresponding pixel circuit 250 in the pixel array 240 is to be prevented or stopped from accumulating additional charge in its respective sense node 203 but is to maintain the charge that has already accumulated in its respective sense node 203.

Although there are other possibilities, in various embodiments such as in the method of FIG. 15, it is assumed that a state of the anti-blooming gate transistor 216 of each pixel circuit 250 is to always be opposite of a state of the transfer gate transistor 202 of the same pixel circuit 250. In other words, in such embodiments, when the transfer gate transistor 202 of the pixel circuit 250 is controlled to be on, the anti-blooming gate transistor 216 of the same pixel circuit 250 is controlled to be off, and when the transfer gate transistor 202 of the pixel circuit 250 is controlled to be off, the anti-blooming gate transistor 216 of the same pixel circuit 250 is controlled to be on.

In various embodiments, when the contents of the exposure pattern buffer 295 are written to the pixel array 240, the transfer gate transistor 202 is turned off and the anti-blooming gate transistor 216 is turned on in each pixel circuit 250 corresponding to an entry in the exposure pattern buffer 295 that has been assigned the logic value of "1". In such pixel circuits 250, when the transfer gate transistor 202 is turned off and the anti-blooming gate transistor 216 is turned on, accumulation of additional photo-generated charge in the corresponding sense node 203 is prevented or inhibited or stopped, and any charge subsequently generated by the corresponding photodiode 201 is substantially drained through the anti-blooming gate transistor 216. Also, in various embodiments, when the contents of the exposure pattern buffer 295 are written to the pixel array 240, the transfer gate transistor 202 remains on and the anti-blooming gate transistor 216 remains off in each pixel circuit 250 corresponding to an entry in the exposure pattern buffer 295 that has been assigned the logic value of "0". In such pixel circuits 250, when the transfer gate transistor 202 is on and the anti-blooming gate transistor 216 is off, photo-generated charge from the corresponding photodiode 201 is allowed to continue accumulating in the corresponding sense node 203.

In various embodiments, the contents of the exposure pattern buffer 295 are written to the pixel array 240 one row at a time. In various embodiments, each bit in the exposure pattern buffer 295 corresponding to a pixel circuit 250 in a selected row to be written is translated into signals on the corresponding pixel control signal line 226 connected to the pixel circuit 250. In various embodiments, when an entry in the exposure pattern buffer 295 corresponding to a pixel circuit 250 has a logical value of "0", the digital image processor 210 provides a HIGH signal on the exposure control signal line 255 and a LOW signal on the anti-blooming control signal line 256 of the pixel control signal line 226 that is connected to the pixel circuit 250. Also, in various embodiments, when an entry in the exposure pattern buffer 295 corresponding to a pixel circuit 250 has a logical value of "1", the digital image processor 210 provides a LOW signal on the exposure control signal line 255 and a HIGH signal on the anti-blooming control signal line 256 of the pixel control signal line 226 that is connected to the pixel circuit 250.

Thus, in various embodiments, the digital image processor 210 provides each of the pixel control signals lines 226₁, 226₂, ..., 226ₘ with signals based on contents of the exposure pattern buffer 295 to control pixel circuits 250 in a particular row. Then, in such embodiments, the pixel control signal generator 213 may provide a HIGH signal on the row control line 223 for the particular row, such that the transfer gate transistor 202 and the anti-blooming gate transistor 216 of each pixel circuit 250 in the particular row is written according to the corresponding provided signals. The pixel control signal generator 213 may then provide a LOW signal on the row control line 223 for the particular row, and the transfer gate transistor 202 and the anti-blooming gate transistor 216 of each pixel circuit 250 in the particular row will maintain their values due to parasitic gate capacitances of those transistors. In various embodiments, the process of writing to the pixel array 240 in accordance with the contents of the exposure pattern buffer 295 may then proceed to a next row in the pixel array 240, and so on, until all rows have been written. In some embodiments, steps S303 to S307 can operate in a pipelined manner, such that exposure pattern data for a first row of the pixel array 240 can be used to update a state of the first row of pixel circuits 250 as soon as, for example, a small set of rows has been read, thus allowing for lower times to perform readout and status updating.

FIG. 19E illustrates an example of the exposure pattern of the pixel array 240 that is set according to the exposure pattern data in the exposure pattern buffer 295 of FIG. 19D. According to the exposure pattern of the pixel array 240 in FIG. 19E, the pixel circuits that are in one of rows 4-6 and in one of columns 2-4 of the pixel array 240 have been controlled to stop integrating additional charge in their respective sense nodes, and controlled to maintain any charge already accumulated in their respective sense nodes. Those pixel circuits correspond to the entries with a logical value of "1" in the exposure pattern buffer 295 of FIG. 19D. The other pixel circuits in the pixel array 240 of FIG. 19E are controlled to continue integrating or accumulating charge in their respective sense nodes. Those pixel circuits correspond to the entries with a logical value of "0" in the exposure pattern buffer 295 of FIG. 19D. Referring again to FIGS. 6 and 15, once the updated exposure pattern data from the exposure pattern buffer 295 has been written to the pixel array 240 in S307 to change the exposure pattern of the pixel array 240, the method continues to S308.

In S308, a total number of pixel circuits 250 in which further exposure has been stopped for the image capture operation, which is equal to a sum of the bits in the exposure pattern buffer 295 that are assigned a logic value of "1", is tested against a predefined threshold value. In a case where the sum of the bits in the exposure pattern buffer 295 is not greater than the threshold value, the method returns to S303. On the other hand, in a case where the sum of the bits in the exposure pattern buffer 295 is greater than the threshold value, the method continues to S309. The sum of the bits of the exposure pattern buffer 295 is one example of many possible image features that could be used to make a determination in step S308. In embodiments in which a logical value of "1" for an entry in the exposure pattern buffer 295 corresponds to a stopping or preventing or inhibiting of accumulation of further charge in a sense node of a pixel circuit corresponding to the entry, once all bits in the exposure pattern buffer 295 have been set to a logical value of "1" there may be no benefit in returning to step S303. In some embodiments, a maximum time limit may also be set for the image capture operation.

Figure 19K:
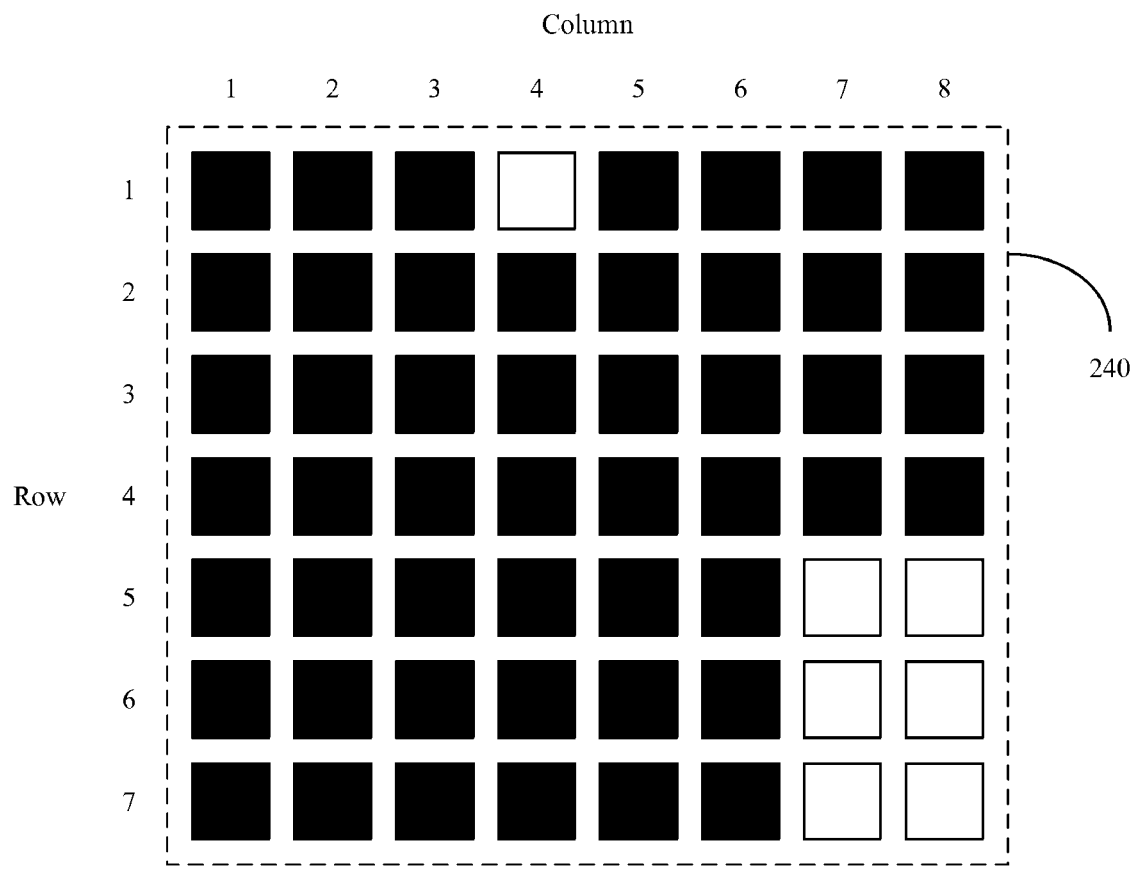

In the example of FIGS. 19A-19K it is assumed that the threshold value to be used for step S308 of FIG. 15 is 45. Of course, that threshold value is merely provided for the example, and other threshold values could be used in other embodiments. Since the sum of the bits in the exposure pattern buffer 295 of FIG. 19D is 9, which is not greater than 45, the example would lead to a return to step S303. FIG. 19F illustrates an example of contents of the exposure pattern buffer 295 after the contents of the exposure pattern buffer 295 of FIG. 19D have been updated by being combined with example filtered binary image data. In the example, the filtered binary image data included a "1" bit corresponding to an output of a pixel circuit in row 2 and column 7 of the pixel array 240 of FIG. 19E. It should be noted that, for various outputs of the pixel array 240, it is possible to have multiple "1" bits in the filtered binary image data. FIG. 19G illustrates an example of the contents of the exposure pattern buffer 295 after the contents of the exposure pattern buffer 295 of FIG. 19F have been dilated in accordance with the example dilation rule specified by the structuring element of FIG. 18D.

FIG. 19H illustrates an example of an exposure pattern of the pixel array 240 that is set according to the contents of the exposure pattern buffer 295 of FIG. 19G. According to the exposure pattern of the pixel array 240 in FIG. 19H, the pixel circuits that are in one of rows 3-7 and in one of columns 1-5, or in one of rows 1-3 and in one of columns 6-8, of the pixel array 240 have been controlled to stop integrating additional charge in their respective sense nodes, and controlled to maintain any charge already accumulated in their respective sense nodes. Those pixel circuits correspond to the entries with a logical value of "1" in the exposure pattern buffer 295 of FIG. 19G. The other pixel circuits in the pixel array 240 of FIG. 19H are controlled to continue integrating or accumulating charge in their respective sense nodes. Those pixel circuits correspond to the entries with a logical value of "0" in the exposure pattern buffer 295 of FIG. 19G. Since the sum of the bits in the exposure pattern buffer 295 of FIG. 19G is 34, which is not greater than the example threshold value of 45, the example would lead to another return to step S303 in FIG. 15.

FIG. 19I illustrates an example of contents of the exposure pattern buffer 295 after the contents of the exposure pattern buffer 295 of FIG. 19G have been updated by being combined with example filtered binary image data. In the example, the filtered binary image data included "1" bits corresponding to pixel circuits in row 1 and columns 1-2 of the pixel array 240 of FIG. 19H. FIG. 19J illustrates an example of the contents of the exposure pattern buffer 295 after the contents of the exposure pattern buffer 295 of FIG. 19I have been dilated in accordance with the example dilation rule specified by the structuring element of FIG. 18D. FIG. 19K illustrates an example of an exposure pattern of the pixel array 240 that is set according to the contents of the exposure pattern buffer 295 of FIG. 19J. Since the sum of the bits in the exposure pattern buffer 295 of FIG. 19J is 49, which is greater than the example threshold value of 45, the example would then proceed to step S309 in FIG. 15.

Referring again to FIGS. 6, 7, and 15, in step S309 image capture is terminated in the pixel array 240. In various embodiments, the image capture is terminated in the pixel array 240 by stopping exposure of any remaining pixel circuits 250 that are still accumulating charge in their respective sense node 203 from their respective photodiode 201. In various embodiments, the stopping of exposure may be carried out by forcing the transfer gate transistor 202 of each of the pixel circuits 250 to an off state and forcing the anti-blooming gate transistor 216 of each of the pixel circuits 250 to an on state. For example, the digital image processor 210 may provide a LOW signal on the exposure control signal line 255 and a HIGH signal on the anti-blooming control signal line 256 of each of the pixel control signal lines $226_1$, $226_2$, ..., $226_m$, and the pixel control signal generator 213 may provide a HIGH signal on the transfer signal line 253 of each of the row control lines $223_1$, $223_2$, ..., $223_n$. In various embodiments, when the image capture is terminated in the pixel array 240 in step S309, the charge that has already accumulated in each sense node 203 of each pixel circuit 250 is maintained in the pixel circuit 250. The method then continues to S310.

In S310, an image captured in the pixel array 240 is readout from the pixel array 240. In various embodiments, the readout of the image in step S310 is performed using the voltage-analog mode. If either the embodiment of the image sensor circuit 200 of FIG. 11 or the embodiment of the image sensor circuit 200 of FIG. 13 is used, the voltage source switch 217, the output mode switch 227, and the digital multiplexer 228 for each column of the pixel array 240 are controlled in accordance with the voltage-analog mode as discussed above. In various embodiments, a voltage-analog readout from the pixel array 240 may be slower than a current-analog readout from the pixel array 240, but the voltage-analog readout from the pixel array 240 may have superior signal-to-noise performance as compared to the current-analog readout. Thus, in various embodiments, it may be beneficial to make the final readout from the pixel array 240 for an image capture operation a voltage-analog readout so as to obtain the best quality signals from the pixel array 240 to define the captured image. In various embodiments, the voltage-analog readout in step S310 is performed using the double sampling amplifier 207 of each of the column ADC circuits 220, so that corrected pixel output voltages are computed based on differences between pixel output voltages and reset voltages. The method then ends in S311. Some electronic shutter operations that conform to the method of FIG. 15 are herein named "wave shutter" operations.

In various embodiments, a pixel array may be initialized, image capture in the pixel array may be initialized, and exposure may be stopped in pixel circuits that are centered on spatial neighborhoods where an image intensity derived metric exceeds a threshold level and in pixel circuits that encounter a signal that is propagated from pixel circuits whose exposure has been stopped. Also, in various embodiments, image capture in a pixel array may be complete when exposure has been stopped in a certain number of pixel circuits of the pixel array during an image capture operation. In various embodiments, a spatially filtered analog image suitable for machine vision processing is captured according to a method in which an exposure of a pixel array is determined by a multidimensional control pattern that evolves episodically as a nonlinear function of analog data contents of the pixel array when it is partially exposed and a structuring element.

Figure 16:
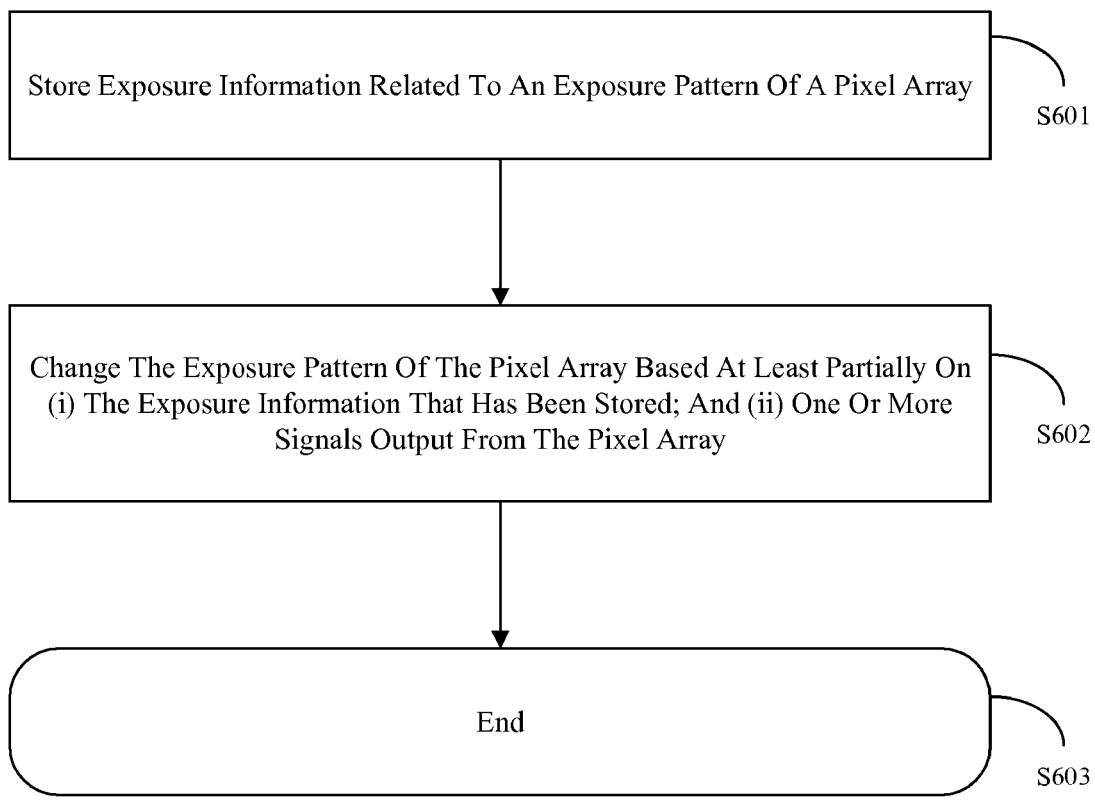
FIG. 16 illustrates a flowchart of a method in an image sensor circuit in accordance with an embodiment of the present invention.

FIG. 16 illustrates a flowchart of a method in accordance with an embodiment of the present invention. In S601, exposure information related to an exposure pattern of a pixel array is stored. In various embodiments, the exposure information may include one or more bits for each pixel circuit in the pixel array. In various other embodiments, the exposure information may include a smaller number of bits than a total number of pixel circuits in the pixel array. In some embodiments, the exposure information may specify a number or other indicator related to the exposure pattern of the pixel array. Also, in some embodiments, the exposure information may include one or more combinations of bits that are related to the exposure pattern of the pixel array. After the exposure information has been stored, the method continues to S602.

In S602, the exposure pattern of the pixel array is changed based at least partially on (i) the exposure information that has been stored; and (ii) one or more signals output from the pixel array. In various embodiments, the exposure information that has been stored is altered based on the one or more signals output from the pixel array, and the altered exposure information is used to control a change in the exposure pattern of the pixel array. In some embodiments, the exposure information that has been stored is altered in accordance with a dilation rule, and the altered exposure information is used to control a change in the exposure pattern of the pixel array. In various embodiments, possible exposure states for each pixel circuit in the pixel array include (i) an on-state in which the pixel circuit is allowed to integrate charge at a sense node of the pixel circuit; and (ii) an off-state in which the pixel circuit is prevented or stopped from integrating additional charge at the sense node. Also, in various embodiments, the exposure pattern of the pixel array is defined by which pixel circuits in the pixel array are in the on-state so that they are still accumulating charge in their sense nodes and which pixel circuits in the pixel array are in the off-state so that they are not accumulating additional charge in their sense nodes. Once the exposure pattern of the pixel array has been changed in S602, the method may end in S603.

FIG. 17 illustrates a flowchart of a method in accordance with an embodiment of the present invention. In S651, an accumulation of charge is started in each of a plurality of pixel circuits of a pixel array, and the method continues to S652. In S652, the integration of charge is prevented in at least a particular pixel circuit of the plurality of pixel circuits that is selected based at least partially on one or more signals output from the pixel array. The method then continues to S653. In S653, the integration of charge is prevented in at least one pixel circuit of the plurality of pixel circuits that is adjacent to the particular pixel circuit in the pixel array based at least partially on a dilation rule. In various embodiments, the dilation rule is specified by a structuring element. The method then ends in S654.

Figure 20:
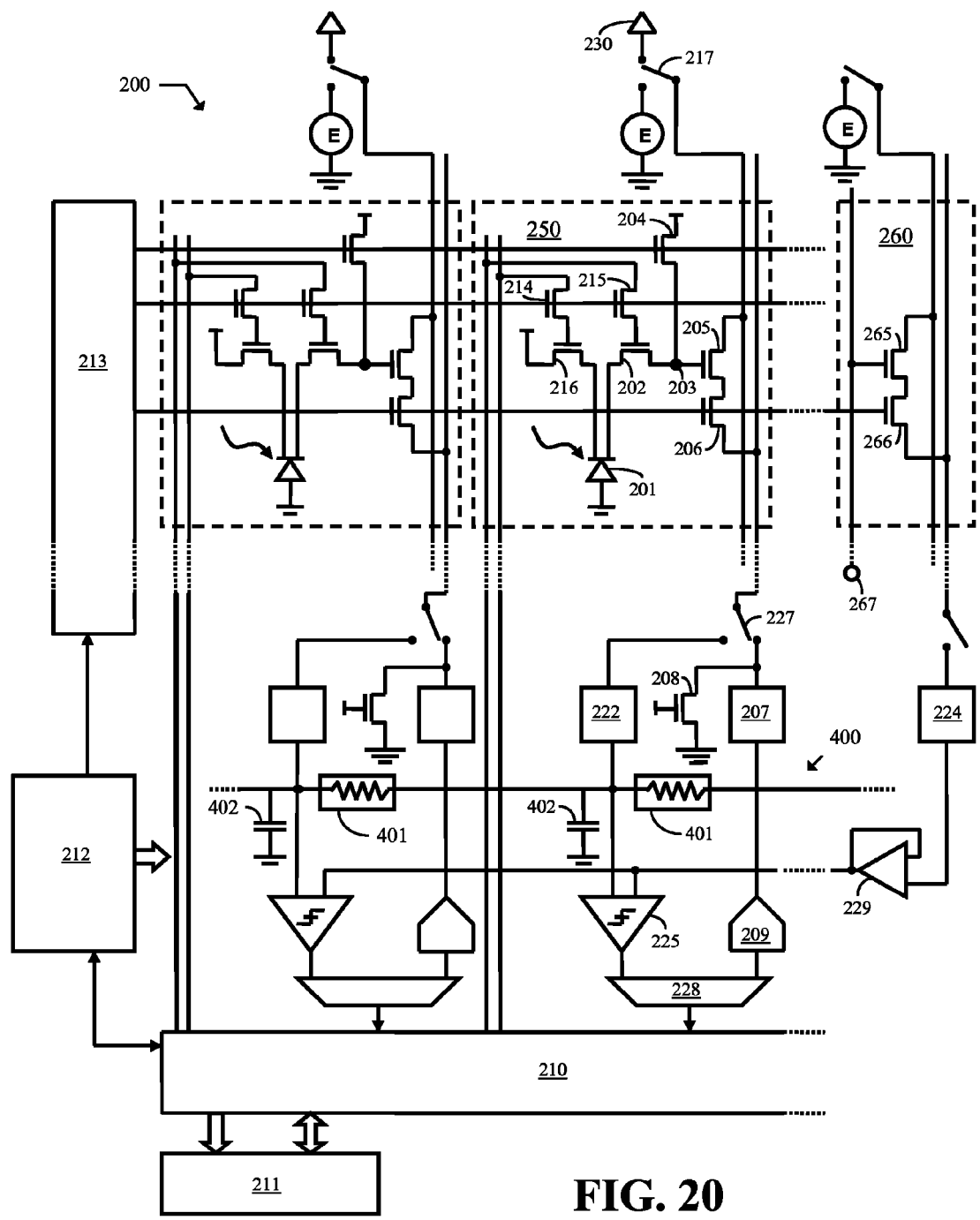
FIG. 20 illustrates an image sensor circuit in accordance with an embodiment of the present invention.

FIG. 20 illustrates another embodiment of the image sensor circuit 200 in accordance with an embodiment of the present invention. The embodiment of the image sensor circuit 200 of FIG. 20 differs from the embodiment of the image sensor circuit 200 of FIG. 11 in that the embodiment of the image sensor circuit 200 of FIG. 20 includes a resistive grid 400. Other elements of the embodiment of the image sensor circuit 200 of FIG. 20 that are the same as elements of the embodiment of the image sensor circuit 200 of FIG. 11 are labeled with the same reference numbers. In various embodiments, the resistive grid 400 includes a plurality of programmable or switchable resistors 401 and a plurality of capacitors 402. In various embodiments, the resistive grid 400 includes a switchable resistor 401 and a capacitor 402 for each column of pixel circuits 250. In various embodiments, each switchable resistor 401 is connected to an output of a corresponding current-to-voltage converter 222 and is connected to one or more adjacent switchable resistors 401. Also, in various embodiments, each capacitor 402 is connected between an output of a corresponding current-to-voltage converter 222 and ground.

In various embodiments, the resistive grid 400 may be used to perform a type of spatial filtering that may be employed, for example, in step S304 of the method of FIG. 15. Performing spatial filtering in an analog domain using the resistive grid 400 in various embodiments may improve a speed of spatial filtering as compared with other embodiments in which spatial filtering is performed in a digital domain by, for example, the digital image processor 210. In some embodiments, the resistive grid 400 is employed to perform horizontal filtering of signals for an image. In various embodiments, each of the switchable resistors 401 is controllable by the control processor 212. In various embodiments, the image sensor circuit 200 of FIG. 20 may be used to carry out the method illustrated in FIG. 15, and the spatial filtering for step S304 may be carried out using the resistive grid 400.

In various embodiments, an operational mode for using the resistive grid 400 comprises three functional steps. In a first step, each current-to-voltage converter 222 for each column of pixel circuits 250 loads a corresponding capacitor 402 while each of the switchable resistors 401 is disconnected. In a second step, an output of each current-to-voltage converter 222 is set to high impedance, and the switchable resistors 401 are connected. In such a state, the voltage value on each capacitor 402 gets spatially low pass filtered, where the spatial filtering bandwidth relates with a time the filtering process is active as well as a value of a resistance of each switchable resistor 401 and a value of a capacitance of each capacitor 402. In a third step, a voltage value stored in each capacitor 402 is compared with a threshold value by the corresponding difference comparator 225 to provide filtered binary image data.

Figure 21:
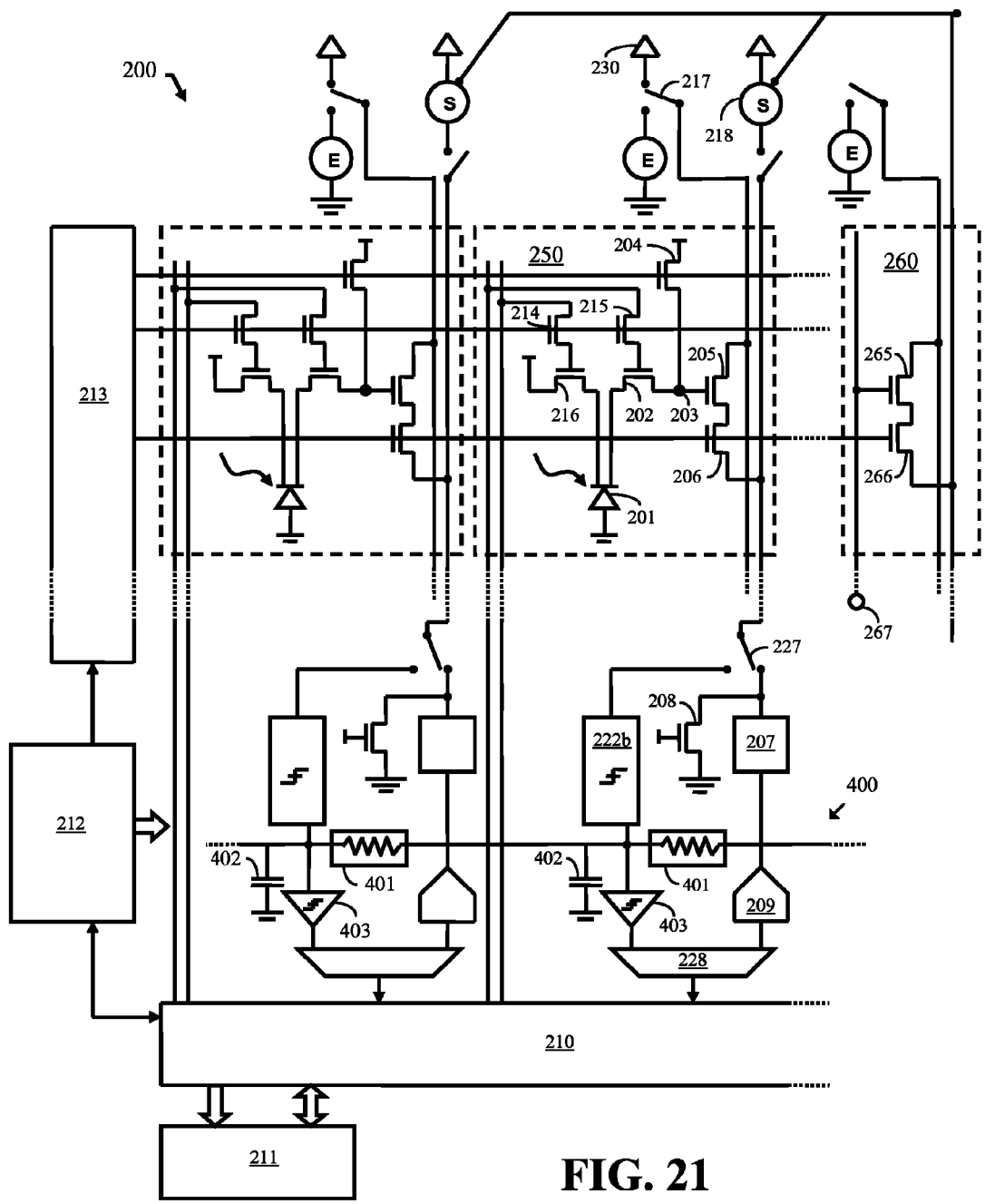
FIG. 21 illustrates an image sensor circuit in accordance with an embodiment of the present invention.

FIG. 21 illustrates another embodiment of the image sensor circuit 200 in accordance with an embodiment of the present invention. The embodiment of the image sensor circuit 200 of FIG. 21 differs from the embodiment of the image sensor circuit 200 of FIG. 13 in that the embodiment of the image sensor circuit 200 of FIG. 21 includes a resistive grid 400. Other elements of the embodiment of the image sensor circuit 200 of FIG. 21 that are the same as elements of the embodiment of the image sensor circuit 200 of FIG. 13 are labeled with the same reference numbers. In various embodiments, the resistive grid 400 includes a plurality of programmable or switchable resistors 401, a plurality of capacitors 402, and a plurality of voltage comparators 403.

In various embodiments, the resistive grid 400 includes a switchable resistor 401, a capacitor 402, and a voltage comparator 403 for each column of pixel circuits 250. In various embodiments, each switchable resistor 401 is connected to an output of a corresponding current comparator 222b and is connected to one or more adjacent switchable resistors 401. Also, in various embodiments, each capacitor 402 is connected between an output of a corresponding current comparator 222b and ground. In various embodiments, an input of each voltage comparator 403 is connected to a corresponding capacitor 402, and an output of each voltage comparator 403 is connected to a corresponding digital multiplexer 228.

In various embodiments, the resistive grid 400 may be used to perform a type of spatial filtering that may be employed, for example, in step S304 of the method of FIG. 15. Performing spatial filtering in an analog domain using the resistive grid 400 in various embodiments may improve a speed of spatial filtering as compared with other embodiments in which spatial filtering is performed in a digital domain by, for example, the digital image processor 210. In some embodiments, the resistive grid 400 is employed to perform horizontal filtering of signals for an image. In various embodiments, each of the switchable resistors 401 is controllable by the control processor 212. In various embodiments, the image sensor circuit 200 of FIG. 21 may be used to carry out the method illustrated in FIG. 15, and the spatial filtering for step S304 may be carried out using the resistive grid 400.

In various embodiments, an operational mode for using the resistive grid 400 in FIG. 21 comprises three functional steps. In a first step, each current comparator 222b for each column of pixel circuits 250 loads a corresponding capacitor 402 while each of the switchable resistors 401 is disconnected. In a second step, an output of each current comparator 222b is set to high impedance, and the switchable resistors 401 are connected. In such a state, the voltage value on each capacitor 402 gets spatially low pass filtered, where the spatial filtering bandwidth relates with a time the filtering process is active as well as a value of an on-resistance of each switchable resistor 401 and a value of a capacitance of each capacitor 402. In a third step, a voltage value stored in each capacitor 402 is digitalized by the corresponding voltage comparator 403 to provide filtered binary image data.

Referring again to FIGS. 6 and 7, in various embodiments the image sensor circuit 200 is configured to obtain an image using a type of electronic shutter operation in which an exposure pattern of the pixel array 240 is set according to exposure information that changes over time based at least partially on charge accumulated in at least a portion of the pixel array 240. When shutter operations that conform, for example, to the method of FIG. 15 are used, a maximum allowable time to complete an image capture operation may be limited by shutter efficiency of the pixel circuits 250. Shutter efficiency may represent an ability of each of the pixel circuits 250 to accurately maintain charge in their sense node 203 during an image capture operation from a time that additional charge is to be inhibited or prevented or stopped from accumulating in the sense node 203 to a time that a final image is read-out of the pixel array 240 for the image capture operation. During such a time period, the stored or maintained charge in the sense node 203 may degrade due to photo-generated charge unintentionally reaching the sense node 203. An amount of such degradation may be proportional to an intensity of light impinging on the pixel circuit 250 and an amount of time that the stored charge must be maintained until it is finally read-out from the pixel array 240.

In various embodiments, an automatic shutter mechanism permits using light intensity to control an exposure time of individual pixel circuits or group of pixel circuits in an image sensor circuit. In some such embodiments, exposure of pixel circuits receiving bright light may be stopped earlier than exposure of pixel circuits receiving less intense light during an image capture operation. In various embodiments, when exposure is ended in a pixel circuit of a pixel array, the sensed value in a sense node of the pixel circuit has to be kept in the sense node until exposure is ended in the rest of the pixel circuits of the pixel array and final signals for an image are read-out from the pixel array. Shutter efficiency may indicate a maximum amount of time that analog information can be stored in a sense node, such as a floating diffusion node, of a pixel circuit of the pixel array without appreciable degradation.

Figure 22:
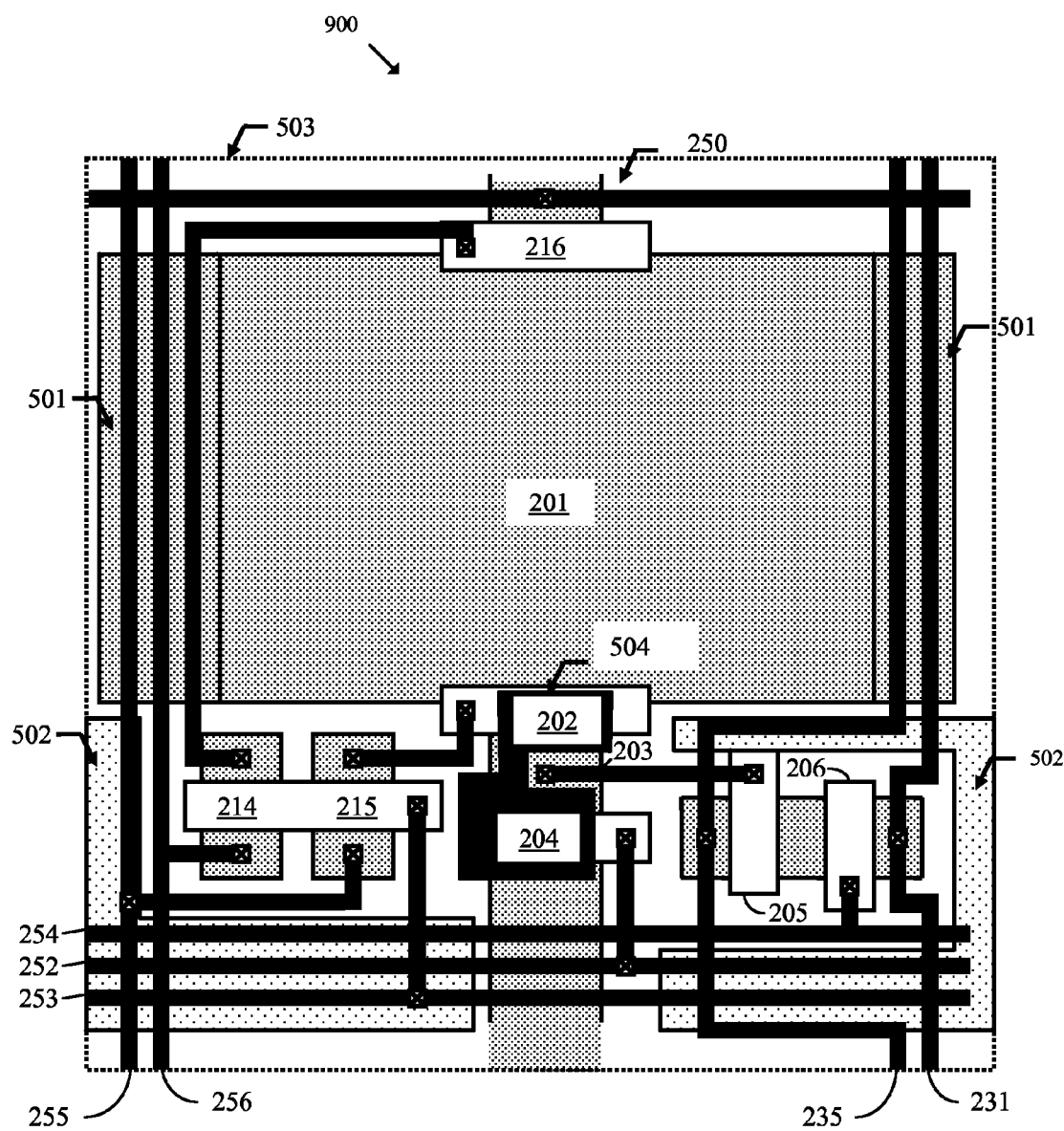
FIG. 22 illustrates a layout in accordance with an embodiment of the present invention.

With reference to FIG. 22, various techniques that may allow for improving a shutter efficiency are herein described. FIG. 22 illustrates a layout 900 in accordance with an embodiment of the present invention. The layout 900 includes the pixel circuit 250. Elements of the embodiment of the pixel circuit 250 in FIG. 22 that are similar to elements of the embodiment of the pixel circuit 250 in FIG. 14 are labeled with the same reference numbers.

In various embodiments, the pixel circuit 250 includes the anti-blooming gate transistor 216. The incorporation of the anti-blooming gate transistor 216 in the pixel circuit 250 may provide a mechanism to prevent charge that is photo-generated in the photodiode 201 after exposure of the pixel circuit 250 has been stopped from reaching the sense node 203 of the pixel circuit 250. Such a use of an anti-blooming gate transistor may differ from a use of anti-blooming gate transistors to avoid that photodiodes of pixel circuits in a neighborhood of a saturated pixel circuit capture an excess of charge of such pixel circuit.

In various embodiments, a photo-sensor, such as the photodiode 201, is extended. For example, an area of the photodiode 201 may be increased with one or more extension areas 501. In some embodiments, the photodiode 201 is a pinned photodiode. Also, in some embodiments, an area of the photodiode 201 is extended or increased as much as possible. In some embodiments, the one or more extension areas 501 may even extend under one or more lines, such as the exposure control signal line 255, the anti-blooming control signal line 256, the voltage source line 235, the column readout line 231, or the like. In various embodiments, the one or more lines are metal lines. In some embodiments, although the one or more extension areas 501 might not improve a response of the pixel circuit 250, the one or more extension areas 501 may increase an area where photo-generated charge is absorbed and, thus, reduce a possibility that such charge unintentionally reaches the sense node 203. Therefore, in various embodiments, the one or more extension areas 501 allow for improving a shutter efficiency.

In various embodiments, the layout 900 further includes one or more dummy diffusions 502. In some embodiments, the one or more dummy diffusions 502 may be located in otherwise empty regions of the pixel circuit 250 that do not belong to the photodiode 201 or to the transistors 214, 215, 204, 205, and 206. Without the one or more dummy diffusions 502 it may be possible that some photo-generated charge reaching the empty regions might diffuse to the sense node 203 and reduce a shutter efficiency. In various embodiments, to prevent such an occurrence, the empty regions are covered with the one or more dummy diffusions 502. In some embodiments, the one or more dummy diffusions 502 are connected to a constant voltage source (not shown in FIG. 22), such as a voltage supply source or the like, so that any photo-generated charge crossing the one or more dummy diffusions 502 is absorbed to the voltage supply source.

In various embodiments, short wavelength illumination is used to help improve shutter efficiency. In various embodiments, using short wavelength light may help to improve shutter efficiency, because short wavelength photons may be absorbed near a silicon surface and therefore can be captured by the photodiode 201. Longer wavelength photons may reach deeper into a substrate, and might fall out from an active area of the photodiode 201, thus increasing their possibility for reaching the sense node 203 and reducing shutter efficiency.

In various embodiments, the layout 900 further includes an infrared (IR) filter 503 on top of the pixel circuit 250. Infrared photons may create problems by penetrating very deep into a substrate of the pixel circuit 250 where no electric field exists, and electrons from those photons may diffuse randomly and reach the sense node 203, degrading data stored in the sense node 203. In various embodiments, by using the IR filter 503 on top of the pixel circuit 250, an amount of photo-generated charge in a deep substrate of the pixel circuit 250 may be decreased, thus allowing for improving shutter efficiency. In some embodiments, the layout 900 may include a color filter (not shown in FIG. 22) on top of the pixel circuit 250. Long wavelength photons in the visible spectrum may behave similar to IR photons and may create problems by penetrating very deep into a substrate of the pixel circuit 250. In various embodiments, a color filter can be used to inhibit such photons from reaching a substrate of the pixel circuit 250. In some embodiments, the pixel circuit 250 may be configured to sense light that is in the visible spectrum. In some embodiments, the pixel circuit 250 may be configured to sense light that is outside of the visible spectrum.

In various embodiments, the layout 900 further includes a metal protection feature 504. In various embodiments, the metal protection feature 504 may cover at least a portion of the sense node 203. In some embodiments, protecting the sense node 203 with a metal protection may allow for reducing a degradation of charge stored the sense node 203 due to light.

Referring again to FIG. 6, in various embodiments the image sensor circuit 200 may be configured to allow for receiving a command that specifies a type of shutter mode to be used for one or more particular image capture operations. For example, in various embodiments, the image sensor circuit 200 may be configured to receive a command that selects one of (i) a global shutter operation; (ii) a rolling shutter operation; and (iii) a wave shutter operation to be used for an image capture operation. In such embodiments, in a case where the command specifies a global shutter operation, the image sensor circuit 200 may capture an image using a global shutter operation. Also, in such embodiments, in a case where the command specifies a rolling shutter operation, the image sensor circuit 200 may capture an image using a rolling shutter operation. Moreover, in such embodiments, in a case where the command specifies a wave shutter operation, the image sensor circuit 200 may capture an image using a wave shutter operation that may conform, for example, to the method of FIG. 15. In various embodiments, in a case where the image sensor circuit 200 is to perform a wave shutter operation, the image sensor circuit 200 may receive a signal that specifies one or more structuring elements to be used in the wave shutter operation. In some embodiments, the image sensor circuit 200 may be configured to select a type of shutter operation automatically based on sensed lighting conditions.

Various example applications for image sensor circuits, such as the image sensor circuit 200, include, for example, uses in manufacturing automation, product assembly, identification (ID) readers, vehicle control, gesture recognition, video surveillance, three-dimensional (3D) modeling, motion analysis, medical devices, military devices, mapping systems, or the like.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:
1. An image sensor circuit, comprising:
   a pixel array comprising a plurality of pixel circuits, wherein at least one of the plurality of pixel circuits includes a sense node whose voltage controls an output signal; and one or more circuits configured to update exposure information based at least partially on one or more signals output from the pixel array, and configured to control an exposure pattern of the pixel array based on the exposure information, wherein said one or more circuits is configured to render a readout of the output signal nondestructive with respect to charge accumulating at the sense node.

2. The image sensor circuit of claim 1,
said one or more circuits configured to iteratively update the exposure information while an image is being captured by the pixel array based at least partially on the one or more signals output from the pixel array and at least one dilation rule.

3. The image sensor circuit of claim 2,
said at least one dilation rule specified by at least one structuring element.

4. The image sensor circuit of claim 1,
said plurality of pixel circuits controllable such that at least one pixel circuit in a row of the pixel array can integrate charge at a sense node of the pixel circuit while at least a second pixel circuit in said row is prevented from integrating charge at a sense node of said second pixel circuit during at least a portion of an image capture operation.

5. The image sensor circuit of claim 1,
said one or more circuits configured to iteratively update the exposure information based at least partially on values of the one or more signals output from the pixel array, said values of the one or more signals indicative of charge accumulated in at least a portion of the pixel array.

6. The image sensor circuit of claim 1,
said one or more circuits configured to individually control exposure states of the plurality of pixel circuits based on the exposure information so as to control the exposure pattern of the pixel array.

7. The image sensor circuit of claim 6,
said exposure states for each pixel circuit of the plurality of pixel circuits including an on-state in which the pixel circuit is allowed to integrate charge at a sense node of the pixel circuit and an off-state in which the pixel circuit is prevented from integrating additional charge at the sense node.

8. The image sensor circuit of claim 1, further comprising:
one or more memory devices for storing the exposure information as exposure pattern data including at least one bit for each pixel circuit of the plurality of pixel circuits to be used for controlling an exposure state of the pixel circuit.

9. The image sensor circuit of claim 8,
said one or more circuits configured to reset the exposure pattern data stored in the one or more memory devices to an initial pattern prior to an image capture operation.

10. The image sensor circuit of claim 1,
said one or more circuits configured to change the exposure pattern of the pixel array a plurality of times while an image is being captured by the pixel array based on the exposure information.

11. The image sensor circuit of claim 1, at least one pixel circuit of the plurality of pixel circuits comprising:
a light sensing element;
a first transistor having a terminal connected to the light sensing element; and
a second transistor connected between an exposure control signal line and a gate of the first transistor;
said one or more circuits configured to control a signal on the exposure control signal line based on the exposure information.

12. The image sensor circuit of claim 11, said at least one pixel circuit further comprising:
a third transistor connected to the light sensing element; and
a fourth transistor connected between an anti-blooming control signal line and a gate of the third transistor;
said one or more circuits configured to control an anti-blooming signal on the anti-blooming control signal line based on the exposure information.

13. The image sensor circuit of claim 12,
said one or more circuits configured to control the anti-blooming signal on the anti-blooming control signal line to be an opposite value of the exposure control signal on the exposure control signal line during an image capture operation.

14. The image sensor circuit of claim 12,
said light sensing element having a first portion that extends below the exposure control signal line and a second portion that extends below the anti-blooming control signal line.

15. The image sensor circuit of claim 11, said at least one pixel circuit further comprising:
one or more dummy diffusions that are connected to a constant voltage during an image capture operation.

16. The image sensor circuit of claim 11, said at least one pixel circuit further comprising:
a reset transistor connected between a fixed voltage and the sense node, a voltage at the sense node controlling an output signal;
said one or more circuits configured to control a reset signal that is applied to a gate of the reset transistor such that the reset transistor remains off during and between at least two readouts of the output signal during an image capture operation so as to render the at least two readouts of the output signal nondestructive with respect to charge accumulating at the sense node.

17. The image sensor circuit of claim 1,
said pixel array further comprising a plurality of column readout lines for providing the one or more signals; and
said one or more circuits configured to selectively control signals on the plurality of column readout lines to be either voltage signals or current signals.

18. The image sensor circuit of claim 1,
wherein the one or more signals are analog current signals.

19. The image sensor circuit of claim 1, further comprising:
a column analog-to-digital converter circuit configured to receive analog signals output on a column readout line of the pixel array from two or more pixel circuits of the plurality of pixel circuits that are in a same column of the pixel array, and configured to convert the analog signals to corresponding digital signals.

20. The image sensor circuit of claim 1,
said plurality of pixel circuits arranged in a plurality of rows and a plurality of columns;
said one or more circuits configured to selectively control the pixel array to provide output from pixel circuits in two or more rows and two or more columns at a same time such that the outputs from the two or more rows combine in analog form on column readout lines of the pixel array.

21. The image sensor circuit of claim 1, further comprising:
a resistive grid including a plurality of switchable resistors and a plurality of capacitors, the plurality of capacitors connected to receive signals having values based on the one or more signals output from the pixel array, the plurality of switchable resistors configured to selectively connect the plurality of capacitors in accordance with command signals;

said one or more circuits configured to sample a voltage stored in at least one of the plurality of capacitors in a case where the plurality of switchable resistors have been controlled to connect the plurality of capacitors and a time period has elapsed; and said one or more circuits configured to update the exposure information based on said voltage.

22. The image sensor circuit of claim 1, said plurality of pixel circuits arranged in a plurality of rows and a plurality of columns, each of the plurality of rows further including a threshold current generator;

said one or more circuits configured to compare a voltage of a reference signal derived from an output of a particular threshold current generator in a particular row of the plurality of rows with a voltage of a signal derived from an output of a particular pixel circuit of the plurality of pixel circuits that is in the particular row, and configured to update the exposure information based on a result of the comparison.

23. The image sensor circuit of claim 1, said one or more circuits configured to terminate an image capture operation in the pixel array based on a comparison between a threshold number and a number calculated from the exposure information.

24. The image sensor circuit of claim 1, said one or more circuits comprising a digital signal processor.

25. The image sensor circuit of claim 1, further comprising:

an infrared filter located on at least a portion of at least one pixel circuit of the plurality of pixel circuits.

26. The image sensor circuit of claim 1, further comprising:

a color filter located on at least a portion of at least one pixel circuit of the plurality of pixel circuits.

27. A method in an image sensor circuit, the image sensor circuit including a pixel array having a plurality of pixel circuits, the method comprising:

storing information related to an exposure pattern of the pixel array; and changing the exposure pattern of the pixel array based at least partially on (i) the information that has been stored and (ii) one or more signals output from the pixel array, wherein said one or more signals output from the pixel array is nondestructive with respect to charge accumulating at a sense node of at least one of the plurality of pixel circuits.

28. A method in an image sensor circuit, the image sensor circuit including a pixel array having a plurality of pixel circuits, the method comprising:

starting an integration of charge in each of the plurality of pixel circuits;

preventing the integration of charge in at least a particular pixel circuit of the plurality of pixel circuits that is selected based at least partially on one or more signals output from the pixel array, wherein said one or more signals output from the pixel array is nondestructive with respect to charge accumulating at a sense node of at least one of the plurality of pixel circuits; and preventing the integration of charge in at least one pixel circuit of the plurality of pixel circuits that is adjacent to the particular pixel circuit in the pixel array based at least partially on a dilation rule.

29. A pixel circuit, comprising:

a photodiode;

a first transistor connected between the photodiode and a sense node, wherein a voltage of the sense node controls an output signal having a readout that is nondestructive with respect to charge accumulating at the sense node; and a second transistor connected between an exposure control signal line and a gate of the first transistor, the second transistor having a gate connected to a transfer signal line.

30. An image processing system, comprising:

an image sensor circuit comprising a pixel array and configured to obtain an image using a type of shutter operation in which an exposure pattern of the pixel array is set according to exposure information that changes over time based at least partially on charge accumulated in at least a portion of the pixel array, wherein a readout of the at least a portion of the pixel array is nondestructive with respect to charge accumulating at the at least a portion of the pixel array; and a processor configured to detect one or more objects in the image.

* * * * *